United States Patent
Kariatsumari et al.

(10) Patent No.: US 7,567,055 B2
(45) Date of Patent: Jul. 28, 2009

(54) CONTROLLER FOR BRUSHLESS MOTOR

(75) Inventors: Yuji Kariatsumari, Kashiwara (JP); Toshiaki Oya, Sakai (JP)

(73) Assignee: Jtekt Corporation, Osaka (JP)

( * ) Notice: Subject to any disclaimer, the term of this patent is extended or adjusted under 35 U.S.C. 154(b) by 98 days.

(21) Appl. No.: 11/726,554

(22) Filed: Mar. 22, 2007

(65) Prior Publication Data
US 2007/0222409 A1 Sep. 27, 2007

(30) Foreign Application Priority Data
Mar. 23, 2006 (JP) .............................. 2006-081746

(51) Int. Cl.
*H02P 3/18* (2006.01)
(52) U.S. Cl. ...................... 318/807; 318/800; 318/727
(58) Field of Classification Search ................ 318/807, 318/727, 800
See application file for complete search history.

(56) References Cited

FOREIGN PATENT DOCUMENTS

| GB | 2 390 767 | 1/2004 |
|---|---|---|
| JP | 2001-145399 | 5/2001 |
| JP | 2001-187578 | 7/2001 |
| KR | 2002-0072077 | 9/2002 |
| WO | WO-2006/014150 | 2/2006 |

*Primary Examiner*—Walter Benson
*Assistant Examiner*—Renata McCloud
(74) *Attorney, Agent, or Firm*—Jordan and Hamburg LLP

(57) ABSTRACT

A controller for a brushless motor determines difference between target currents and detected currents in a dq coordinate system and determines a target voltage applied to an armature winding based on a feedback calculation, such as PI (Proportional Integral) calculation, P (Proportional) calculation, or PID (Proportional Integral Derivative) calculation, to decrease the differences.

6 Claims, 14 Drawing Sheets

US 7,567,055 B2

CONTROLLER FOR BRUSHLESS MOTOR

BACKGROUND OF THE INVENTION

The present invention relates to a controller for a brushless motor that determines differences between target currents and detected currents in a dq coordinate system and determines a target voltage applied to an armature winding based on a feedback calculation, such as PI (Proportional Integral) calculation, P (Proportional) calculation, or PID (Proportional Integral Derivative) calculation, to decrease the differences.

A conventional controller for a brushless motor comprises a current detection part that detects currents flowing in the armature winding, a rotation position detection part that detects a rotation position of a rotor of the motor, a dq-axes target current calculation part that calculates a d-axis target current and a q-axis target current, a dq-axes current calculation part that determines a d-axis current and a q-axis current based on the detected currents and the detected rotation position, a d-axis target voltage calculation part that determines a d-axis target voltage based on the PI calculation for the d-axis current so as to decrease a d-axis difference between the d-axis target current and the d-axis current, and a q-axis target voltage calculation part that determines a q-axis target voltage based on the PI calculation for the q-axis current so as to decrease a q-axis difference between the q-axis target current and the q-axis current, in which the controller generates the rotation force of the rotor by applying the voltage to the armature winding based on the d-axis target voltage, q-axis target voltage, and the detected rotation position (Japanese Patent Application Laid-open No. 2001-187578).

SUMMARY OF THE INVENTION

When the dq-axes target voltages are determined based on the results of the PI calculation, limiters for limiting the target voltages are required to prevent the target voltage applied to the armature winding from exceeding a maximum set value, with preventing the waveform representing the variation of voltage applied to the armature winding relative to the variation of the rotation position of the rotor from being discontinuous. If the limiters are not provided, the results of the PI calculation continuously increase in a case where the differences between the target currents and the detected currents are not decreased. As a result, a certain time is required for the target voltages corresponding to the results of the PI calculation to reach appropriate values even when the differences decrease. Further, because the maximum voltage that can be applied to the armature winding is regulated according to, e.g., the power source capacity, the waveform representing the variation of voltage applied to the armature winding relative to the variation of the rotation position of the rotor becomes discontinuous when the target voltages becomes too high. For example, the waveform assumes a shape obtained by clipping the vicinity of peaks of the sine wave, thereby causing abnormal noise or vibrations.

In a comparative example represented by the block diagram in FIG. 11, a d-axis difference $\delta I_d$ between a d-axis target current $I_d^*$ and a d-axis current $I_d$ is determined in a d-axis PI calculation part 101a, a result $V_{do}$ of the PI calculation is determined by performing the PI calculation, a q-axis difference $\delta I_q$ between a q-axis target current $I_q^*$ and a q-axis current $I_q$ is determined in a q-axis PI calculation part 101b, and a result $V_{qo}$ of the PI calculation is determined by performing the PI calculation. In a dq-axes limiting value calculation part 102, a d-axis limiting value and a q-axis limiting value are determined such that the target voltage applied to the armature winding does not exceed a set maximum value and a waveform representing the variation of the voltage applied to the armature winding relative to the variation of the rotation position of the rotor do not become discontinuous. A d-axis target voltage $V_d^*$ is determined by limiting the absolute value of the result $V_{do}$ of the PI calculation for the d-axis current with a d-axis limiter 103 so that the absolute value becomes equal to or less than the d-axis limiting value, and a q-axis target voltage $V_q^*$ is determined by limiting the absolute value of the result $V_{qo}$ of the PI calculation for the q-axis current with a q-axis limiter 104 so that the absolute value becomes equal to or less than the q-axis limiting value. Here, the output value of the d-axis limiter 103 is used as a preceding value of the PI calculation for the d-axis current in the next calculation cycle, and the output value of the q-limiter 104 is used as a preceding value of the PI calculation for the q-axis current in the next calculation cycle. In the figure, $K_P$ is a proportional gain, $K_I$ is an integral gain, and $Z^{-1}$ is a preceding value of signal.

In the conventional controller, the responsiveness of the brushless motor fluctuates according to the rotation speed and current value even if the above-described limiters are provided, therefore stable responsiveness cannot be obtained. It is an object of the present invention to provide a controller for a brushless motor that can resolve such a problem.

A controller for a brushless motor to which the present invention is applied comprises a current detection part that detect a current flowing in an armature winding of the brushless motor, a rotation position detection part that detects a rotation position of a rotor of the motor, a dq-axes target current calculation part that calculates a d-axis target current and a q-axis target current, where an axis along a magnetic flux direction of a field system of the rotor is taken as the d axis and an axis perpendicular to the d axis and a rotation axis of the rotor is taken as the q axis, a dq-axes current calculation part that determines a d-axis current and a q-axis current based on the detected current and the detected rotation position, a d-axis target voltage calculation part that determines a d-axis target voltage based on a feedback calculation for the d-axis current so as to decrease a d-axis difference between the d-axis target current and the d-axis current, and a q-axis target voltage calculation part that determines a q-axis target voltage based on a feedback calculation for the q-axis current so as to decrease a q-axis difference between the q-axis target current and the q-axis current, in which a rotation force of the rotor is generated by applying a voltage to the armature winding based on the d-axis target voltage, the q-axis target voltage, and the detected rotation position.

The first feature of the present invention is that a d-axis correction value calculation part for determining a d-axis correction value $-\omega L_q I_q$ and a q-axis correction value calculation part for determining a q-axis correction value $\omega L_d I_d + \omega \Phi$ are provided, the d-axis target voltage is determined based on a value obtained by correcting a result of the feedback calculation for the d-axis current with the d-axis correction value $-\omega L_q I_q$, and the q-axis target voltage is determined based on a value obtained by correcting a result of the feedback calculation for the q-axis current with the q-axis correction value $\omega L_d I_d + \omega \Phi$.

The second feature of the present invention is that a d-axis correction value calculation part for determining a d-axis correction value $-\omega L_q I_q$ and a q-axis correction value calculation part for determining a q-axis correction value $\omega L_d I_d$, are provided, the d-axis target voltage is determined based on a value obtained by correcting a result of the feedback calculation for the d-axis current with the d-axis correction value $-\omega L_q I_q$, and the q-axis target voltage is determined based on a value obtained by correcting a result of the feedback calculation for the q-axis current with the q-axis correction value $\omega L_d I_d$.

In the present invention, $\omega$ stands for a rotation speed (rad/sec) of the rotor, $L_d$ stands for a d-axis self-inductance of the armature winding, $L_q$ stands for a q-axis self-inductance of the armature winding, $I_d$ stands for the d-axis current, $I_q$ stands for the q-axis current, and $\Phi$ stands for a value obtained by multiplying a maximum value of magnetic flux linkage of the armature winding in the field system by a factor of $(3/2)^{1/2}$.

The d-axis voltage $V_d$ and the q-axis voltage $V_q$ can be approximately determined from the following formulas, where R stands for a resistance of the armature wiring, and P stands for a differential operator:

$$V_d = (R+PL_d)I_d - \omega L_q I_q$$

$$V_q = (R+PL_q)I_q + \omega L_d I_d + \omega \Phi$$

Therefore, using either feature of the present invention makes it possible to determine the d-axis target voltage based on the value obtained by correcting the result of the feedback calculation for the d-axis current with the d-axis correction value $-\omega L_q I_q$, so that the influence on the responsiveness of the brushless motor due to the difference between the d-axis target voltage and the d-axis voltage arising in accordance with the rotation speed $\omega$ and the q-axis current $I_q$ can be reduced by comparison with the case where no such correction is made.

Using the first feature of the present invention makes it possible to determine the q-axis target voltage based on the value obtained by correcting the result of the feedback calculation for the q-axis current with the q-axis correction value $\omega L_d I_d + \omega \Phi$, so that the influence on the responsiveness of the brushless motor due to the difference between the q-axis target voltage and the q-axis voltage arising in accordance with the rotation speed $\omega$, the d-axis current $I_d$, and the magnetic flux $\Phi$ can be reduced by comparison with the case where no such correction is made.

Using the second feature of the present invention makes it possible to determine the q-axis target voltage based on the value obtained by correcting the result of the feedback calculation for the q-axis current with the q-axis correction value $\omega L_d I_d$, so that the influence on the responsiveness of the brushless motor due to the difference between the q-axis target voltage and the q-axis voltage arising in accordance with the rotation speed $\omega$ and the d-axis current $I_d$ can be reduced by comparison with the case where no such correction is made.

As a result, the responsiveness of the brushless motor can be prevented from fluctuating even if the rotation speed and/or the current value change.

In the comparative example shown in FIG. 11, limiting the absolute value of the result $V_{do}$ of the PI calculation for the d-axis current to the d-axis limiting value with the single d-axis limiter 103 and limiting an absolute value of the result $V_{qo}$ of the PI calculation for the q-axis current to the q-axis limiting value with the single q-axis limiter 104 are fulfilled; it suffices to determine the d-axis limiting value and the q-axis limiting value such that the target voltage applied to the armature winding does not exceed a set maximum value and the waveform representing the variation of the voltage applied to the armature winding relative to the variation of the rotation position of the rotor does not become a discontinuous wave.

However, the d-axis target voltage cannot be determined correctly when the result of the PI calculation for the d-axis current is corrected with the d-axis correction value, if the d-axis limiting value is determined without respect to the d-axis correction value and the result of the PI calculation for the d-axis current is limited with a single d-axis limiter. Thus, a case may be considered in which an absolute value of a value obtained by correcting the result of the PI calculation for the d-axis current with the d-axis correction value is limited to the d-axis limiting value by a single d-axis limiter and the output value of the d-axis limiter is used as a preceding value of the PI calculation for the d-axis current in the next calculation cycle (for example, in this case, the d-axis correction value is added to the result of the PI calculation for the d-axis current at the point of $\alpha$ in FIG. 11). In this case, the correction value is added to the value used as the preceding value of the PI calculation in the next calculation cycle, so that there is a problem that the PI calculation cannot be performed appropriately. To resolve this problem, a case may be considered in which the result of the PI calculation for the d-axis current that is not corrected is used as the preceding value of the PI calculation for the d-axis current in the next calculation cycle (for example, in this case, the d-axis correction value is added to the result of the PI calculation for the d-axis current at the point of $\alpha$ in FIG. 11, and the result of the PI calculation for the d-axis current at the point of $\beta$ is used as the preceding value of the PI calculation in the next calculation cycle as shown by a broken line). In this case, the preceding value of the PI calculation in the next calculation cycle cannot be limited by the d-axis limiter 103, so that there is a problem that the result of the PI calculation continues to increase when the difference between the target current and the detected current does not decrease. Further, a case may be considered in which the absolute value of the result of the PI calculation for the d-axis current that is not corrected is limited to the d-axis limiting value by a single d-axis limiter (for example, in this case, the d-axis correction value is added to the result of the PI calculation for the d-axis current at the point of $\gamma$ in FIG. 11). In this case, if the positive or negative of the d-axis correction value is set to decrease the absolute value of the d-axis target voltage, the absolute value of the d-axis target voltage is further decreased by the correction after being decreased by the d-axis limiter 103. Thus, the absolute value of the d-axis target voltage is unnecessarily decreased, so that there is a problem that the power source voltage cannot be used effectively. The same problem arises when the result of the PI calculation for the q-axis current is corrected with the q-axis correction value.

Hence, in the present invention, the above-described controller preferably comprises a dq-axes limiting value calculation part that determines a d-axis limiting value and a q-axis limiting value so that a target voltage applied to the armature winding does not exceed a set maximum value, a d-axis addition part that adds the d-axis correction value to the result of the feedback calculation for the d-axis current, a q-axis addition part that adds the q-axis correction value to the result of the feedback calculation for the q-axis current, a first d-axis limiter that limits an absolute value the sum of the d-axis correction value and the result of the feedback calculation for the d-axis current to the d-axis limiting value, a second d-axis limiter that limits an absolute value of the result of the feedback calculation for the d-axis current to the d-axis limiting value, a first q-axis limiter that limits an absolute value of the sum of the q-axis correction value and the result of the feedback calculation for the q-axis current to the q-axis limiting value, and a second q-axis limiter that limits an absolute value of the result of the feedback calculation for the q-axis current to the q-axis limiting value, wherein an output value of the first d-axis limiter is treated as the d-axis target voltage, an output value of the first q-axis limiter is treated as the q-axis target voltage, an output value of the second d-axis limiter is used as a preceding value of the feedback calculation for the d-axis current in a next calculation cycle, and an output value of the second q-axis limiter is used as a preceding value of the feedback calculation for the q-axis current in a next calculation cycle.

As a result, the absolute value of the sum of the d-axis correction value and the result of the feedback calculation for the d-axis current is limited to the d-axis limiting value by the first d-axis limiter. The d-axis target voltage can be determined based on the value limited by the first d-axis limiter, that is, the output value of the first d-axis limiter. Further, the absolute value of the result of the feedback calculation for the d-axis current is limited to the d-axis limiting value by the second d-axis limiter. The value limited by the second d-axis limiter, that is, the output value of the second d-axis limiter, can be used as a preceding value of the feedback calculation for the d-axis current in the next calculation cycle. Therefore, the result of the feedback calculation for the d-axis current can be corrected and the preceding value of the feedback calculation in the next calculation cycle can be limited to the d-axis limiting value, without unnecessarily decreasing the absolute value of the d-axis target value and without adding the correction value to the preceding value of the feedback calculation in the next calculation cycle.

Likewise, the absolute value of the sum of the q-axis correction value and the result of the feedback calculation for the q-axis current is limited to the q-axis limiting value by the first q-axis limiter. The q-axis target voltage can be determined based on the value limited to the first q-axis limiter, that is, the output value of the first q-axis limiter. Further, the absolute value of the result of the feedback calculation for the q-axis current is limited to the q-axis limiting value by the second q-axis limiter. The value limited by the second q-axis limiter, that is, the output value of the second q-axis limiter, can be used as a preceding value of the feedback calculation for the q-axis current in the next calculation cycle. Therefore, the result of feedback calculation for the q-axis current can be corrected and the preceding value of the feedback calculation in the next calculation cycle can be limited to the q-axis limiting value, without unnecessarily decreasing the absolute value of the q-axis target value and without adding the correction value to the preceding value of the feedback calculation in the next calculation cycle.

Alternatively, in the present invention, the above-described controller preferably comprises a dq-axes limiting value calculation part that determines a d-axis limiting value and a q-axis limiting value so that a target voltage applied to the armature winding does not exceed a set maximum value, a d-axis corrected limiting value calculation part that determines a d-axis corrected limiting value that is obtained by subtracting an absolute value of the d-axis correction value from the d-axis limiting value, a q-axis corrected limiting value calculation part that determines a q-axis corrected limiting value that is obtained by subtracting an absolute value of the q-axis correction value from the q-axis limiting value, a d-axis limiter that limits an absolute value of the result of the feedback calculation for the d-axis current to the d-axis corrected limiting value, a q-axis limiter that limits an absolute value of the result of the feedback calculation for the q-axis current to the q-axis corrected limiting value, a d-axis addition part that adds the d-axis correction value to an output value of the d-axis limiter, a q-axis addition part that adds the q-axis correction value to an output value of the q-axis limiter, wherein an output value of the d-axis addition part is treated as the d-axis target voltage, an output value of the q-axis addition part is treated as the q-axis target voltage, the output value of the d-axis limiter is used as a preceding value of the feedback calculation for the d-axis current in a next calculation cycle, and the output value of the q-axis limiter is used as a preceding value of the feedback calculation for the q-axis current in a next calculation cycle.

As a result, the d-axis corrected limiting value that is obtained by subtracting the absolute value of the d-axis correction value from the d-axis limiting value is determined by the d-axis corrected limiting value calculation part, and the absolute value of the result of the feedback calculation for the d-axis current is limited to the d-axis corrected limiting value by the d-axis limiter. The value limited by the d-axis limiter, that is, the output value of the d-axis limiter, can be used as a preceding value of the feedback calculation for the d-axis current in the next calculation cycle. Further, the d-axis target voltage can be determined based on the value obtained by adding the d-axis correction value to the output value of the d-axis limiter, that is, based on the output value of the d-axis addition part. Therefore, the result of the feedback calculation for the d-axis current can be corrected and the preceding value of the feedback calculation for the d-axis current in the next calculation cycle can be limited by the d-axis limiter, without unnecessarily decreasing the absolute value of the d-axis target voltage and without adding the correction value to the preceding value of the feedback calculation for the d-axis current in the next calculation cycle.

Moreover, the preceding value of the feedback calculation for the d-axis current in the next calculation cycle is limited to the d-axis corrected limiting value rather than to the d-axis limiting value. This d-axis limiting value is determined such that it does not exceed the set maximum value of the target voltage applied to the armature winding. Further, when one of the d-axis voltage and the q-axis voltage increases, the other decreases, and the d-axis correction value correlates with the q-axis current. Therefore, the d-axis corrected limiting value obtained by subtracting the absolute value of the d-axis correction value from the d-axis limiting value can be brought close to the actual maximum value that can be applied to the armature winding. Thus, the preceding value of the feedback calculation for the d-axis current in the next calculation cycle is prevented from being limited to an unnecessarily large limiting value, and the convergence ability of the result of the feedback calculation in the d-axis can be improved.

Likewise, the q-axis corrected limiting value that is obtained by subtracting the absolute value of the q-axis correction value from the q-axis limiting value is determined by the q-axis corrected limiting value calculation part, and the absolute value of the result of the feedback calculation for the q-axis current is limited to the q-axis corrected limiting value by the q-axis limiter. The value limited by the q-axis limiter, that is, the output value of the q-axis limiter, can be used as the preceding value of the feedback calculation for the q-axis current in the next calculation cycle. The q-axis target voltage can be determined based on the value obtained by adding the q-axis correction value to the result of the feedback calculation for the q-axis current limited by the q-axis limiter with the q-axis addition part, that is, based on the output value of the q-axis addition part. Therefore, the result of the feedback calculation for the q-axis current can be corrected and the preceding value of the feedback calculation for the q-axis current in the next calculation cycle can be limited by the q-axis limiter, without unnecessarily decreasing the absolute value of the q-axis target voltage and without adding the correction value to the preceding value of the feedback calculation for the q-axis current in the next calculation cycle.

Moreover, the preceding value of the feedback calculation for the q-axis current in the next calculation cycle is limited to the q-axis corrected limiting value rather than to the q-axis limiting value. The q-axis limiting value is determined such that it does not exceed the set maximum value of the target voltage applied to the armature winding. Further, when one of the d-axis voltage and the q-axis voltage increases, the other decreases, and the q-axis correction value correlates with the d-axis current. Therefore, the q-axis corrected limiting value obtained by subtracting the absolute value of the q-axis correction value from the q-axis limiting value can be brought close to the actual maximum value that can be applied to the armature winding. Thus, the preceding value of the feedback calculation for the q-axis current in the next calculation cycle is prevented from being limited to an unnecessarily large limiting value, and the convergence ability of the result of the feedback calculation in the q-axis can be improved.

With the controller for a brushless motor according to the present invention, the responsiveness of the brushless motor can be stabilized with eliminating the influence of the rotation speed and/or the current value.

DETAILED DESCRIPTION OF THE INVENTION

A controller for brushless motor of the first embodiment of the present invention is described below with reference to FIGS. 1 to 8B.

Figure 1:
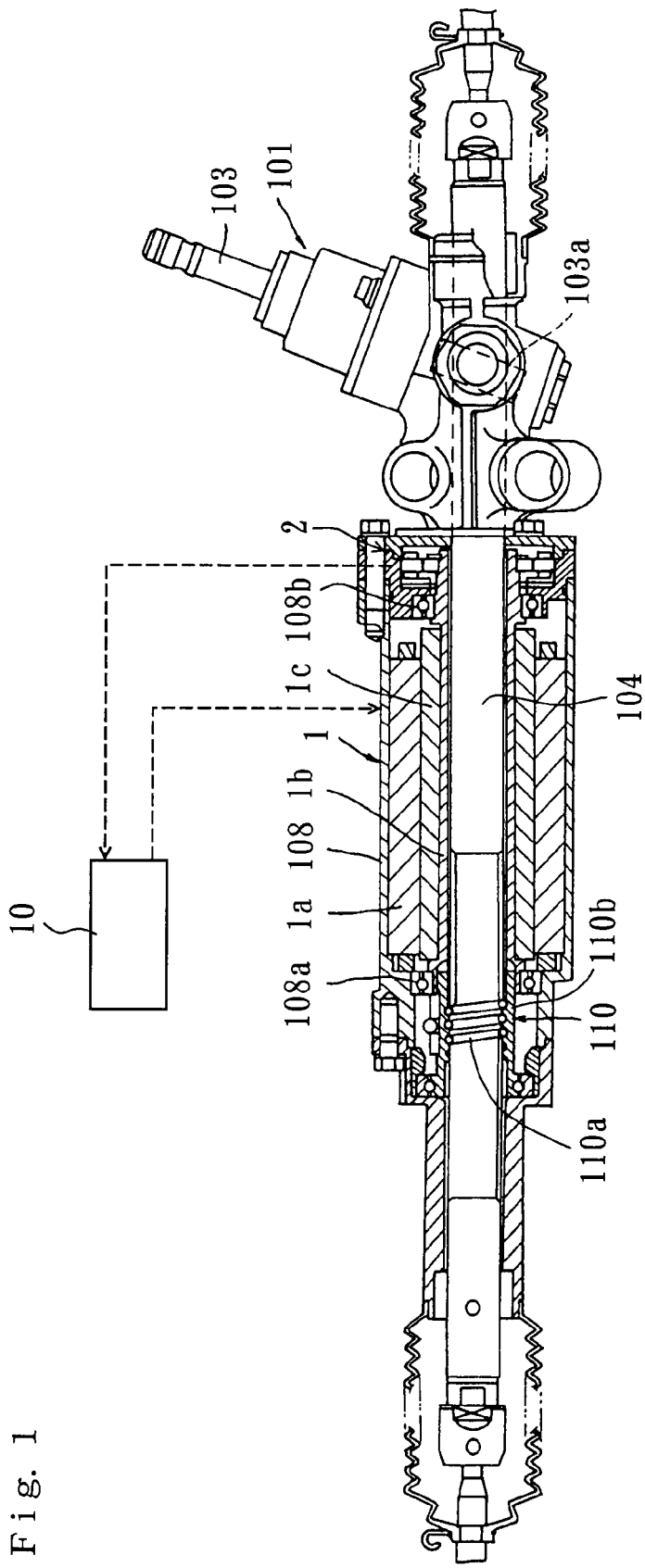
FIG. 1 is a partial sectional view of an electric power steering apparatus of embodiments of the present invention.

An electric power steering device 101 of a rack-pinion type for a vehicle that is shown in FIG. 1 comprises a steering shaft 103 that is rotated by steering operation, a pinion 103a provided on the steering shaft 103, a rack 104 engaged with the pinion 103a, a three-phase brushless motor 1 for generating steering assist power, and a screw mechanism 110 for transmitting the output of the motor 1 to the rack 104. Each end of the rack 104 is linked to a wheel (no shown in the figures). When the pinion 103a is rotated by steering operation, the rack 104 moves in the widthwise direction of the vehicle, and the steering angle changes due to the movement of the rack 104.

The motor 1 comprises a stator 1a that is fixed to a housing 108 covering the rack 104, a cylindrical rotor 1b that is rotatably supported by the housing 108 via bearings 108a, 108b, and a magnet 1c provided as a field system of the rotor 1b. The stator 1a has three-phase coils constituting an armature winding of the motor 1. In the present embodiment, a U-phase coil, a V-phase coil, and a W-phase coil are provided as the three-phase coils. The rotor 1b surrounds the rack 104. A resolver 2 serves as a rotation position detection part that detects the rotation position of the rotor 1b.

The screw mechanism 110 has a ball screw shaft 110a integrally formed on the outer periphery of the rack 104 and a ball nut 110b engaged with the ball screw shaft 110a via balls. The ball nut 110b is connected to the rotor 1b. As a result, when the motor 1 rotates the ball nut 110b, the steering assist power is provided along the longitudinal direction of the rack 104. The motor 1 is connected to a controller 10.

Figure 2:
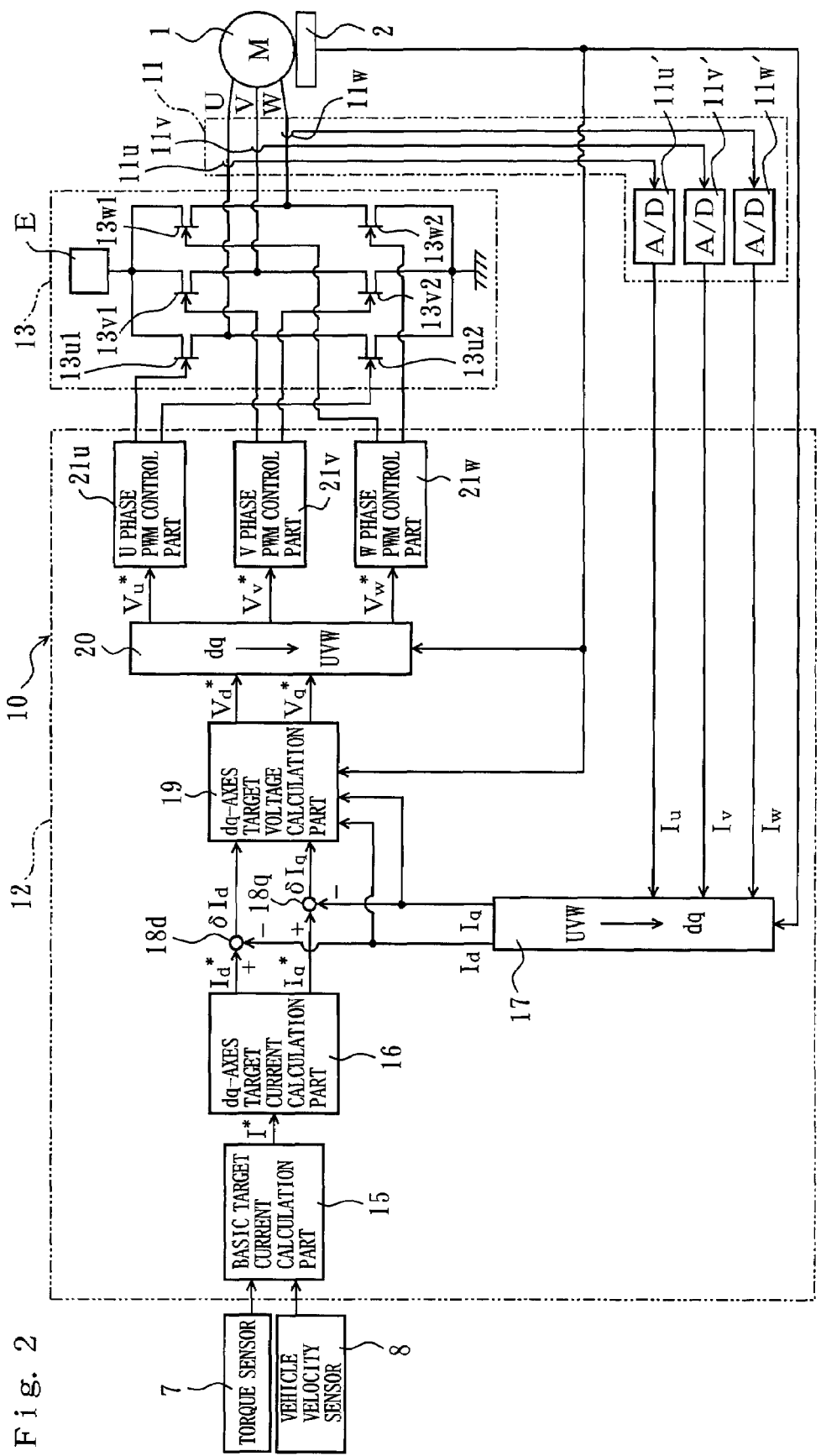
FIG. 2 is a schematic explanatory drawing of a controller of the embodiments of the present invention.

A block diagram of FIG. 2 shows the configuration of the controller 10. The controller 10 has a current detection part 11, a signal processing part 12, and a drive part 13. The resolver 2, a torque sensor 7 that detects the steering torque transmitted by the steering shaft 103, and a vehicle velocity sensor 8 that detects the vehicle velocity are connected to the controller 10.

The current detection part 11 detects currents flowing in the armature winding of the motor 1. The current detection part 11 of the present embodiment has current detectors 11u, 11v, 11w that detect respective phase currents in the three-phase coils and AD converters 11u', 11v', 11w' that perform AD conversion of current detection signals produced by the current detectors 11u, 11v, 11w.

The signal processing part 12 is comprised, for example, of a microcomputer and has a basic target current calculation part 15, a dq-axes target current calculation part 16, a dq-axes current calculation part 17, a d-axes difference calculation part 18d, a q-axis difference calculation part 18q, a dq-axes target voltage calculation part 19, a target voltage coordinate conversion part 20, and PWM (pulse width modulation) control parts 21u, 21v, 21w.

The drive part 13 has a pair of U-phase FET13u1, FET13u2, a pair of V-phase FET13v1, FET13v2, and a pair of W-phase FET13w1, FET13w2 as switching elements for power supply to constitute an inverter circuit. In each phase, a point between the pair of FETs is connected to the coil of the motor 1 via a power supply line. The phase currents flowing between the drive part 13 and the coils of the motor 1 are detected by the current detectors 11u, 11v, 11w.

The basic target current calculation part 15 calculates a basic target current I* of the motor 1 based on the steering torque that is detected by the torque sensor 7 and the vehicle velocity detected by the vehicle velocity sensor 8. The calculation of the basic target current I* can be performed by a known method. For example, the larger the value of the steering torque becomes and the smaller the vehicle velocity becomes, the larger the basic target current I* becomes.

The basic target current I* calculated by the basic target current calculation part 15 is inputted into the dq-axes target current calculation part 16. The dq-axes target current calculation part 16 calculates a d-axis target current $I_d^*$ for generating magnetic field in the d-axis direction and a q-axis target current $I_q^*$ for generating magnetic field in the q-axis direction, where an axis along the magnetic flux direction of the field system (magnet 1c) of the rotor 1b is taken as the d axis, and an axis perpendicular to the d axis and the rotation axis of the rotor 1b is taken as the q axis. The calculations in the dq-axes target current calculation part 16 can be performed by using known calculation formulas.

The phase currents $I_u$, $I_v$, $I_w$ outputted from the current detection part 11 are inputted into the dq-axes current calculation part 17. The dq-axes current calculation part 17 calculates a d-axis current $I_d$ and a q-axis current $I_q$ based on the detected phase currents $I_u$, $I_v$, $I_w$ outputted from the current detection part 11 and the rotation position of the rotor 1b detected by the resolver 2. The calculations in the dq-axes current calculation part 17 can be performed by using known calculation formulas.

The d-axis difference calculation part 18d determines a d-axis difference $\delta I_d$ between the d-axis target current $I_d^*$ and the d-axis current $I_d$, and the q-axis difference calculation part 18q determines a q-axis difference $\delta I_q$ between the q-axis target current $I_q^*$ and the q-axis current $I_q$.

The dq-axes target voltage calculation part 19 determines a d-axis target voltage $V_d^*$ corresponding to the d-axis difference $\delta I_d$ and a q-axis target voltage $V_q^*$ corresponding to the q-axis difference $\delta I_q$.

The target voltage coordinate conversion part 20 calculates target applied voltages $V_u^*$, $V_v^*$, $V_w^*$ to the U-phase coil, V-phase coil, and W-phase coil from the d-axis target voltage $V_d^*$, the q-axis target voltage $V_q^*$ and the rotation position of the rotor 1b detected by the resolver 2. The calculations in the target voltage coordinate conversion part 20 can be performed by using known calculation formulas.

The PWM control parts 21u, 21v, 21w generate PWM control signals that are pulse signals having duty ratios corresponding to the respective target applied voltages $V_u^*$, $V_v^*$, $V_w^*$. The FET13u1, 13u2, 13v1, 13v2, 13w1, 13w2 of the drive part 13 are switched by the PWM control signals so that the voltages applied to the coils of respective phases of the motor 1 by a battery E become the target applied voltages $V_u^*$, $V_v^*$, $V_w^*$. As a result, voltages are applied to the armature winding to generate the rotation force of the rotor 1b based on the d-axis target voltage $V_d^*$, q-axis target voltage $V_q^*$, and detected rotation position of the rotor 1b.

Figure 3:
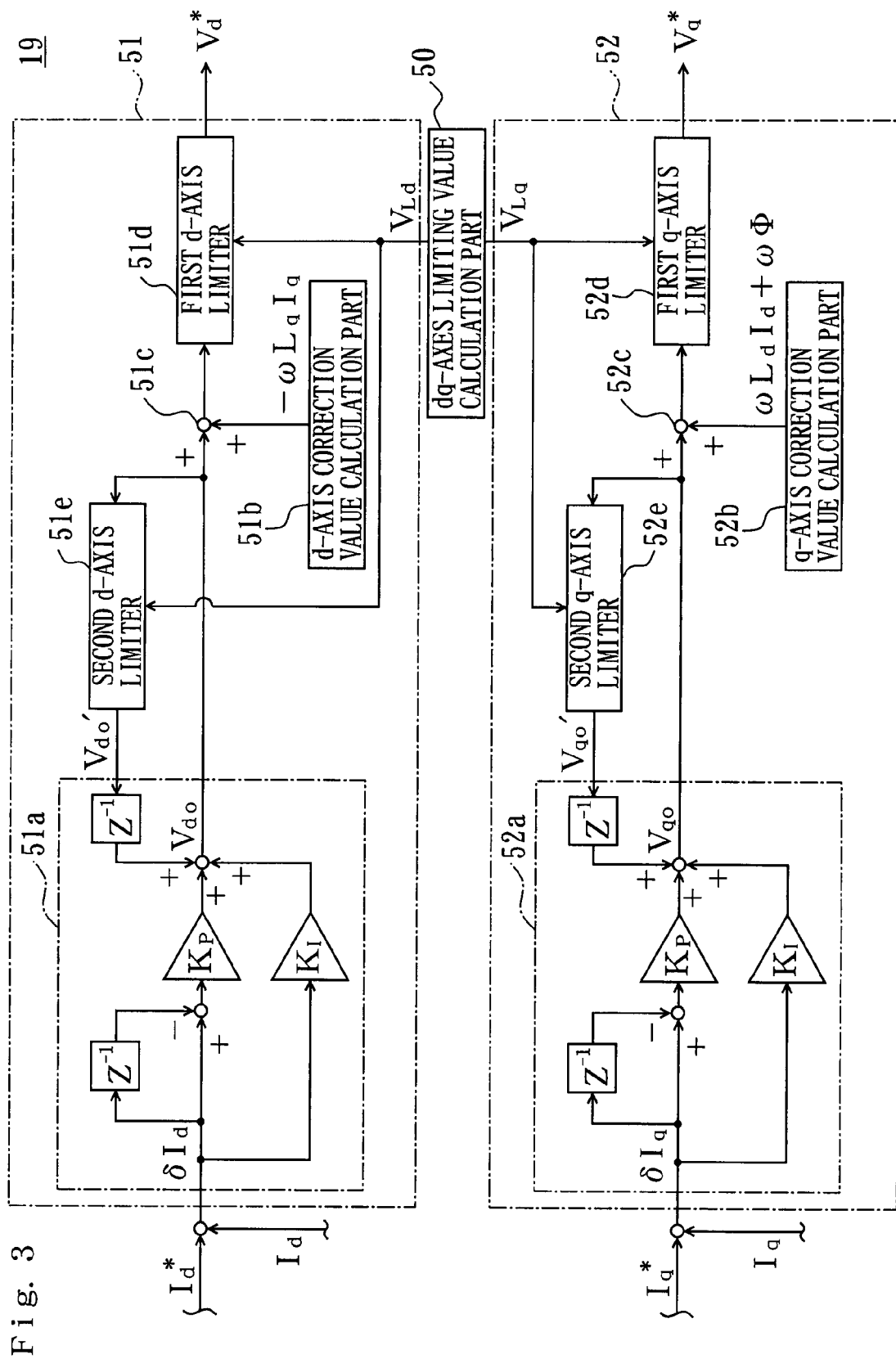
FIG. 3 is a block-diagram illustrating the configuration of a dq-axes target voltage calculation part in the controller of the first embodiment of the present invention.

A block-diagram of FIG. 3 shows the configuration of the dq-axes target voltage calculation part 19. The dq-axes target voltage calculation part 19 has a dq-axes limiting value calculation part 50, a d-axis target voltage calculation part 51, and a q-axis target voltage calculation part 52. The d-axis target voltage calculation part 51 determines the d-axis target voltage $V_d^*$ based on the PI calculation for the d-axis current so as to decrease the d-axis difference $\delta I_d$. The q-axis target voltage calculation part 52 determines the q-axis target voltage $V_q^*$ based on the PI calculation for the q-axis current so as to decrease the q-axis difference $\delta I_q$.

Figure 4:
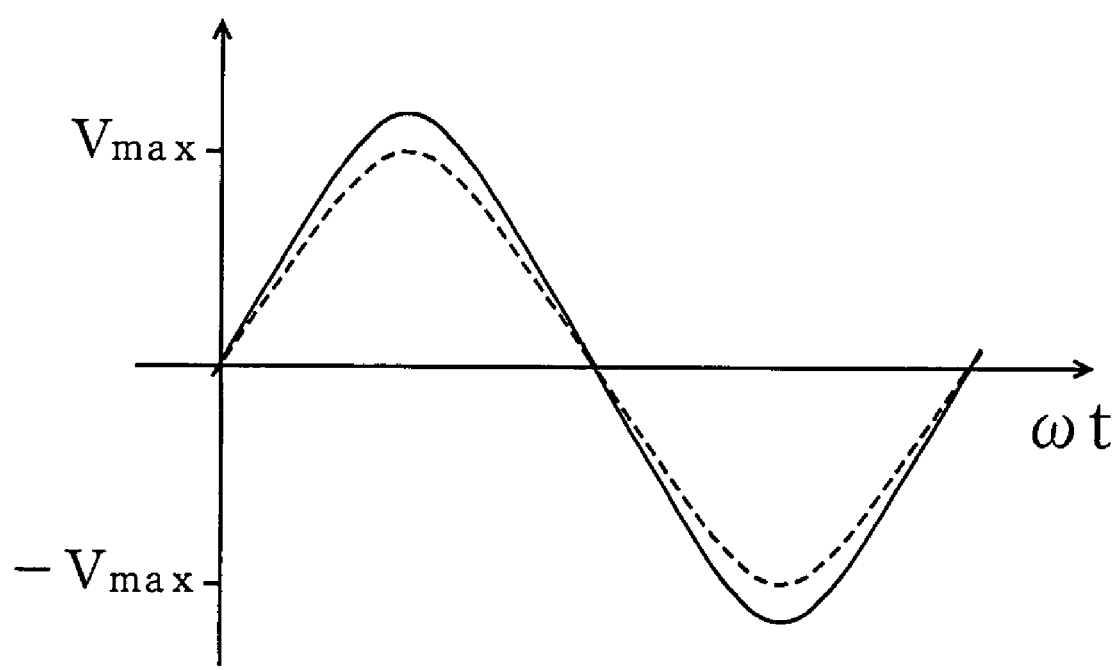
FIG. 4 illustrates an example of relationship between the rotation position of the rotor and the target applied voltage.

The dq-axes limiting value calculation part 50 determines a d-axis limiting value $V_{Ld}$ and a q-axis limiting value $V_{Lq}$ such that the target applied voltages to the armature winding of the motor 1 do not exceed a set maximum value $V_{max}$ to make the waveform representing the variation of the voltage applied to the armature winding relative to the variation of the rotation position of the rotor 1b a sine wave rather than a discontinuous wave. FIG. 4 shows an example of the relationship between the rotation position $\omega t$ of the rotor 1b and the target applied voltage to the coil of each phase. A broken line represents a case where the absolute value of the d-axis target voltage $V_d^*$ is limited to the d-axis limiting value $V_{Ld}$ and the q-axis target voltage $V_q^*$ is limited to the q-axis limiting value $V_{Lq}$, and a solid line represents a case where no such limitations are imposed. The set maximum value $V_{max}$ of the target applied voltages is preset according, for example, to the capacity of the battery E, and the limiting values $V_{Ld}$, $V_{Lq}$ are preset according, for example, to a d-axis output voltage.

The d-axis target voltage calculation part 51 has a d-axis PI calculation part 51a, a d-axis correction value calculation part 51b, a d-axis addition part 51c, a first d-axis limiter 51d, and a second d-axis limiter 51e.

The d-axis PI calculation part 51a calculates a value $V_{do}$ by the PI calculation for the d-axis current, and outputs the result $V_{do}$ of the PI calculation to the d-axis addition part 51c and the second d-axis limiter 51e. In the figure, $K_P$ is a proportional gain, $K_I$ is an integral gain, and $Z^{-1}$ is a preceding value of signal.

The d-axis correction value calculation part 51b determines a d-axis correction value $-\omega L_q I_q$ based on the variation rate of the detected rotation position obtained with the resolver 2 and the q-axis current $I_q$ determined with the dq-axes current calculation part 17, where $\omega$ stands for a rotation speed (rad/sec) of the rotor 1b and $L_q$ stands for a q-axis self-inductance of the armature winding of the motor 1.

The d-axis addition part 51c adds the d-axis correction value $-\omega L_q I_q$ to the result $V_{do}$ of the PI calculation for the d-axis current.

The first d-axis limiter 51d limits an absolute value of the sum of the d-axis correction value $-\omega L_q I_q$ and the result $V_{do}$ of the PI calculation for the d-axis current to the d-axis limiting value $V_{Ld}$. The output value of the first d-axis limiter 51d is treated as the d-axis target value $V_d^*$. As a result, the d-axis target value $V_d^*$ is determined based on the value obtained by correcting the result $V_{do}$ of the PI calculation for the d-axis current with the d-axis correction value $-\omega L_q I_q$.

The second d-axis limiter 51e limits an absolute value of the result $V_{do}$ of the PI calculation for the d-axis current that is used as a preceding value of the PI calculation in the next calculation cycle to the d-axis limiting value $V_{Ld}$. In other words, the output value $V_{do}'$ of the second d-axis limiter 51e is used as a preceding value of the PI calculation for the d-axis current in the next calculation cycle.

The q-axis target voltage calculation part 52 has a q-axis PI calculation part 52a, a q-axis correction value calculation part 52b, a q-axis addition part 52c, a first q-axis limiter 52d, and a second q-axis limiter 52e.

The q-axis PI calculation part 52a calculates a value $V_{qo}$ by the PI calculation for the q-axis current, and outputs the result $V_{qo}$ of the PI calculation to the q-axis addition part 52c and the second q-axis limiter 52e. In the figure, $K_P$ is a proportional gain, $K_I$ is an integral gain, and $Z^{-1}$ is a preceding value of signal.

The q-axis correction value calculation part 52b determines a q-axis correction value $\omega L_d I_d + \omega \Phi$ based on the variation rate of the detected rotation position obtained with the resolver 2 and the d-axis current $I_d$ determined with the dq-axes current calculation part 17, where ω stands for a rotation speed (rad/sec) of the rotor 1b, $L_d$ stands for a d-axis self-inductance of the armature winding of the motor 1, and Φ stands for a value obtained by multiplying a maximum value of magnetic flux linkage of the armature winding in the field system of the rotor 1b by a factor of $(3/2)^{1/2}$.

The q-axis addition part 52c adds the q-axis correction value $\omega L_d I_d + \omega \Phi$ to the result $V_{qo}$ of the PI calculation for the q-axis current.

The first q-axis limiter 52d limits an absolute value of the sum of the q-axis correction value $\omega L_d I_d + \omega \Phi$ and the result $V_{qo}$ of the PI calculation for the q-axis current to the q-axis limiting value $V_{Lq}$. The output value of the first q-axis limiter 52d is treated as the q-axis target value $V_q^*$. As a result, the q-axis target value $V_q^*$ is determined based on the value obtained by correcting the result $V_{qo}$ of the PI calculation for the q-axis current with the q-axis correction value $\omega L_d I_d + \omega \Phi$.

The second q-axis limiter 52e limits an absolute value of the result $V_{qo}$ of the PI calculation for the q-axis current that is used as a preceding value of the PI calculation in the next calculation cycle to the q-axis limiting value $V_{Lq}$. In other words, the output value $V_{qo}'$ of the second q-axis limiter 52e is used as a preceding value of the PI calculation for the q-axis current in the next calculation cycle.

Figure 5:
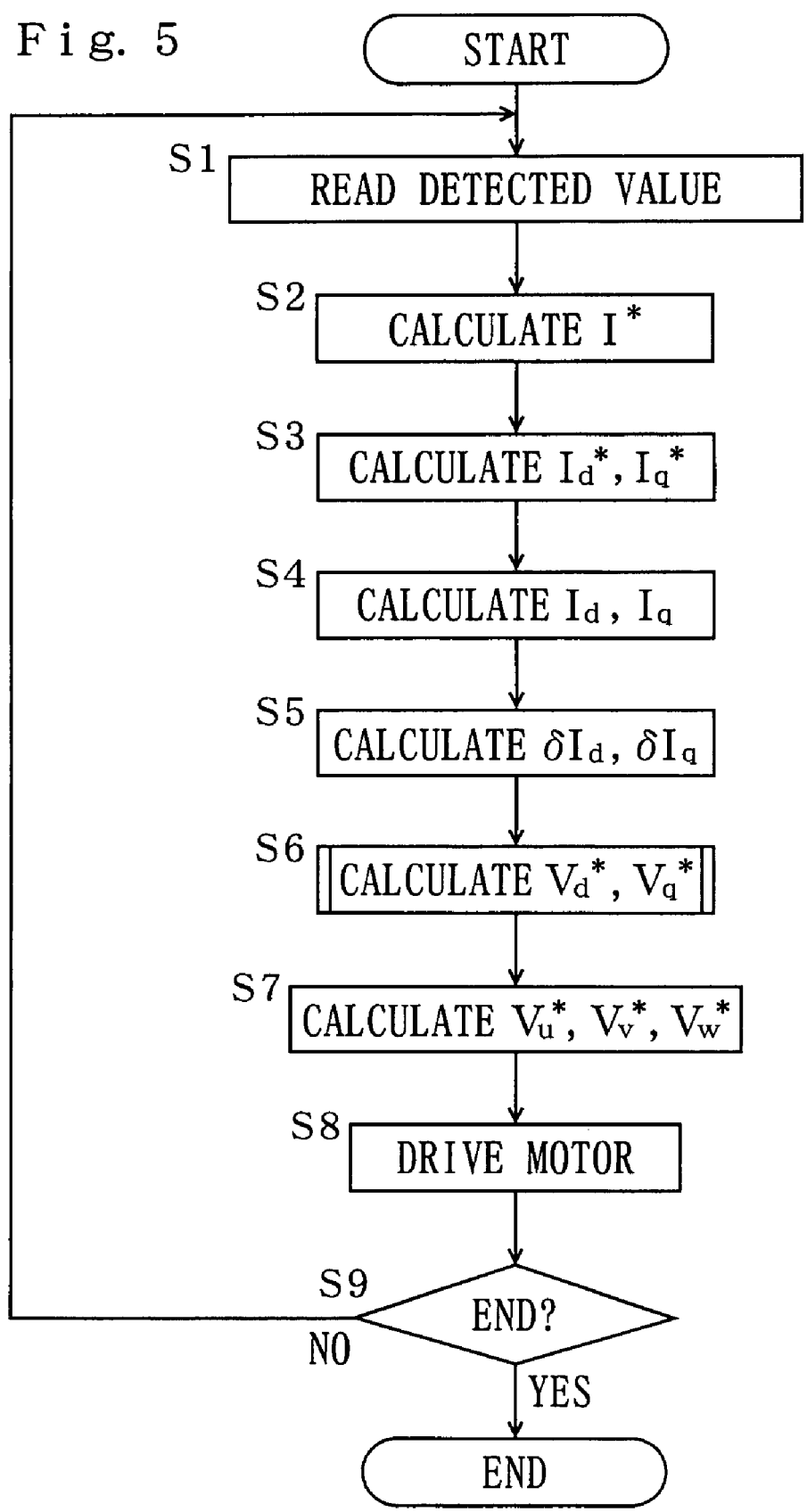
FIG. 5 is a flowchart illustrating the control procedure performed with the controller of the embodiment of the present invention.

The flowchart of FIG. 5 shows a control procedure of the motor 1 with the controller 10. First, the detection values of the torque sensor 7, the vehicle velocity sensor 8, and the current detectors 11u, 11v, 11w are read (step S1), the target current I* is calculated in the basic target current calculation part 15 based on the detected steering torque and the vehicle velocity (step S2), the d-axis target current $I_d^*$ and the q-axis target current $I_q^*$ corresponding to the target current I* are calculated in the dq-axes target current calculation part 16 (step S3), the d-axis current $I_d$ and the q-axis current $I_q$ corresponding to the detected phase currents $I_u, I_v, I_w$ are calculated in the dq-axes current calculation part 17 (step S4), the d-axis difference $\delta I_d$ is calculated in the d-axis difference calculation part 18d from the d-axis target current $I_d^*$ and the d-axis current $I_d$, and the q-axis difference $\delta I_q$ is calculated in the q-axis difference calculation part 18q from the q-axis target current $I_q^*$ and the q-axis current $I_q$ (step S5), then the d-axis target voltage $V_d^*$ and the q-axis target voltage $V_q^*$ are calculated in the dq-axes target voltage calculation part 19 (step S6), the target applied voltages $V_u^*, V_v^*, V_w^*$ to the U-phase coil, V-phase coil, and W-phase coil corresponding to the d-axis target voltage $V_d^*$ and the q-axis target voltage $V_q^*$ are calculated in the target voltage coordinate conversion part 20 (step S7), then the motor 1 is driven by switching the FET 13u1, 13u2, 13v1, 13v2, 13w1, 13w2 of the drive part 13 by the PWM control signals corresponding to the target applied voltages $V_u^*, V_v^*, V_w^*$ generated in the PWM control parts 21u, 21v, 21w (step S8), and whether the control is to be ended is judged, for example, by ON/OFF state of the ignition switch (step S9); where the control is not to be ended, the processing flow returns to step S1 to proceed to the next calculation cycle.

Figure 6A:
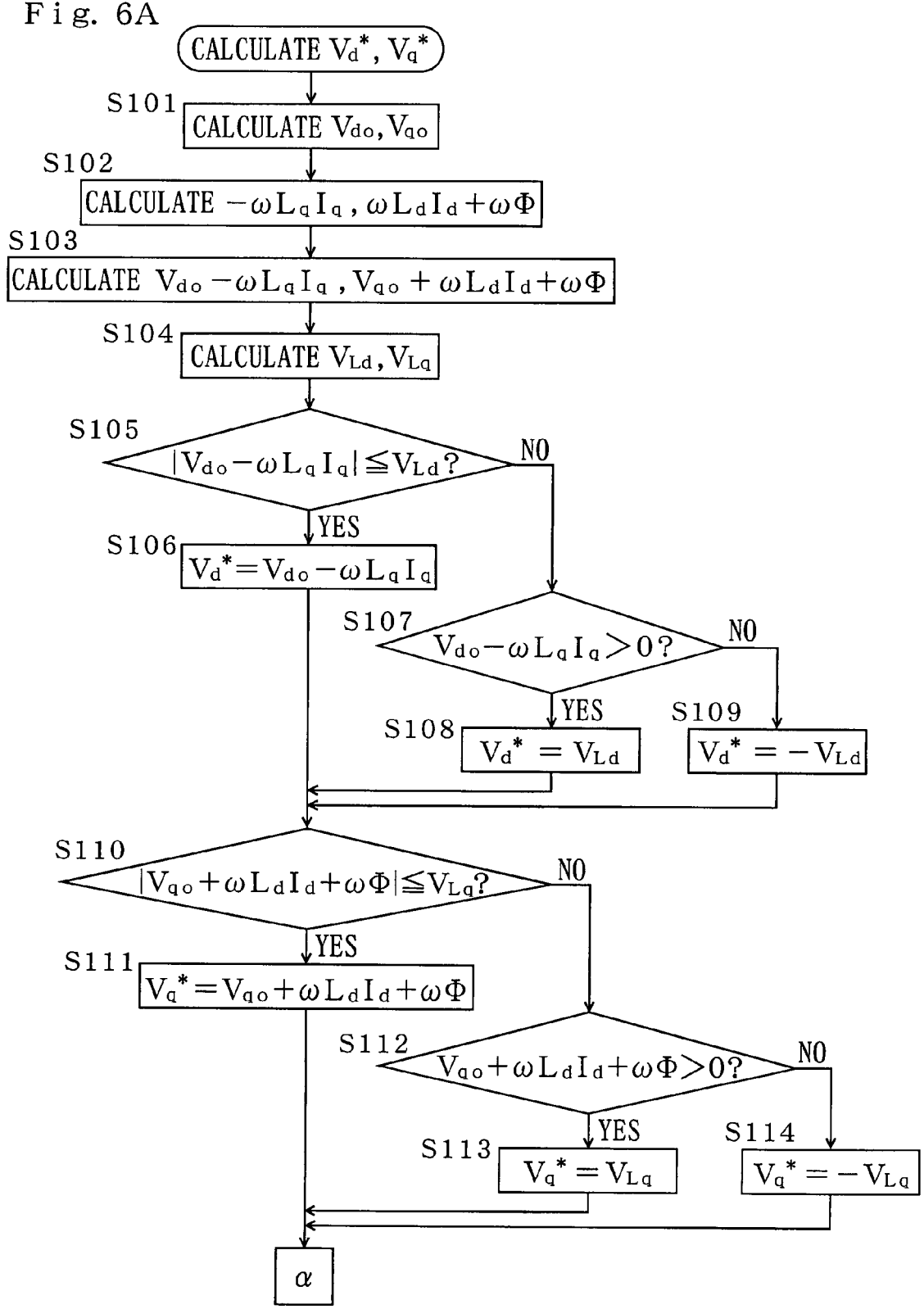
FIG. 6A is a flow chart illustrating the calculation procedure of the target voltage with the controller of the first embodiment of the present invention.
Figure 6B:
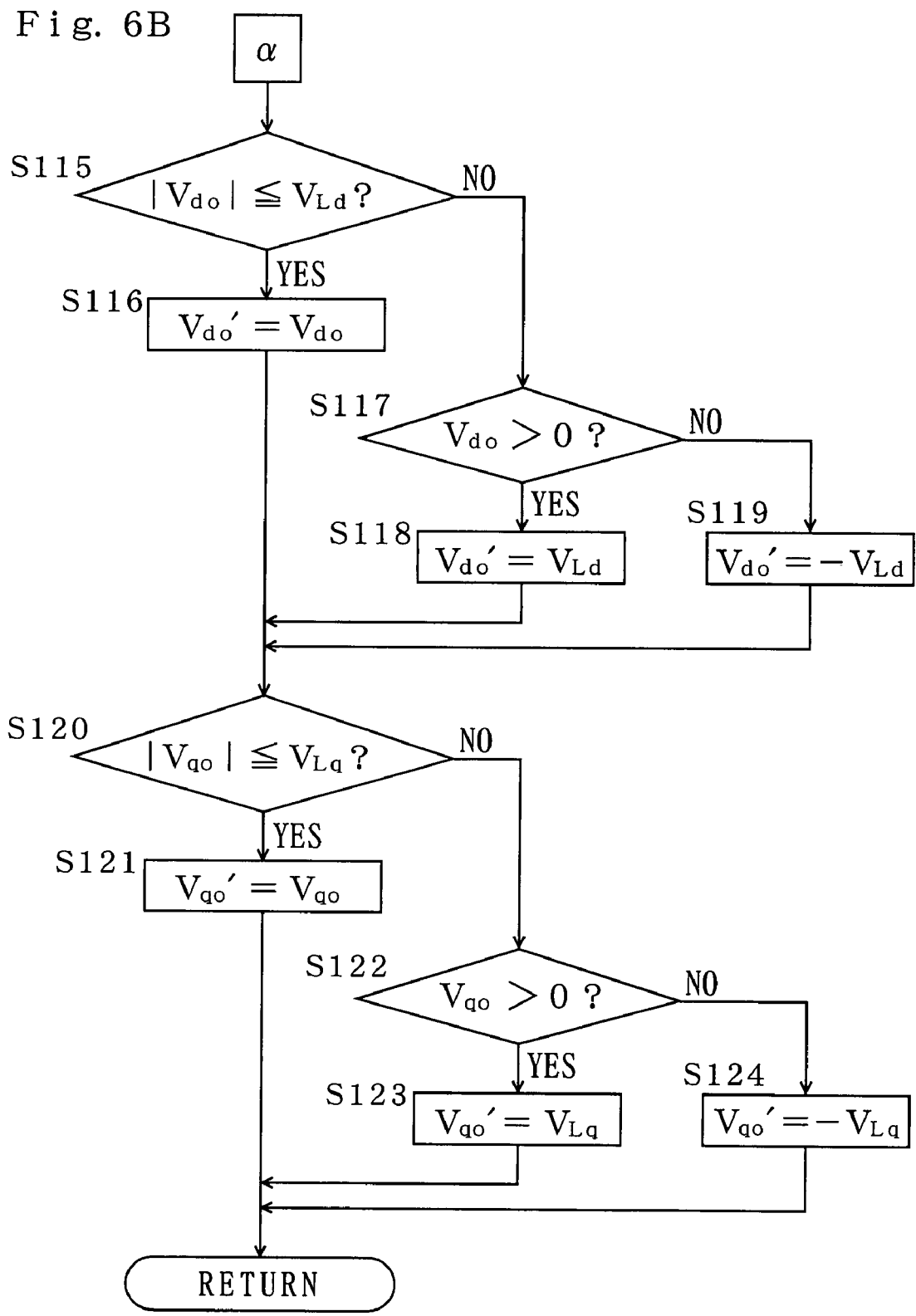
FIG. 6B is a flow chart illustrating the calculation procedure of the target voltage with the controller of the first embodiment of the present invention.

The flowcharts of FIG. 6A and FIG. 6B show the calculation procedure of the d-axis target voltage $V_d^*$ and the q-axis target voltage $V_q^*$ at the above-described step S6 in the first embodiment. First, the results $V_{do}, V_{qo}$ of the PI calculations are determined by the PI calculation for the d-axis current and the PI calculation for the q-axis current (step S101), the d-axis correction value $-\omega L_q I_q$ is determined in the d-axis correction value calculation part 51b, and the q-axis correction value $\omega L_d I_d + \omega \Phi$ is determined in the q-axis correction value calculation part 52b (step S102), the correction is performed by adding the d-axis correction value $-\omega L_q I_q$ to the result $V_{do}$ of the PI calculation for the d-axis current and adding the q-axis correction value $\omega L_d I_d + \omega \Phi$ to the result $V_{qo}$ of the PI calculation for the q-axis current (step S103), and the d-axis limiting value $V_{Ld}$ and the q-axis limiting value $V_{Lq}$ are calculated (step S104). Then, a limiting process is performed in which an absolute value of $V_{do} - \omega L_q I_q$, which is a value obtained by correcting the result of the PI calculation in the d-axis, is limited to the d-axis limiting value $V_{Ld}$ by the first d-axis limiter 51d, and an absolute value of $V_{qo} + \omega L_d I_d + \omega \Phi$, which is a value obtained by correcting the result of the PI calculation in the q-axis, is limited to the q-axis limiting value $V_{Lq}$ by the first q-axis limiter 52d. To be more precise, whether or not the absolute value of $V_{do} - \omega L_q I_q$ is equal to or lower than $V_{Ld}$ is judged (step S105), and if it is equal to or less than $V_{Ld}$, the $V_{do} - \omega L_q I_q$ is outputted as the d-axis target voltage $V_d^*$ (step S106), and if it is not equal to or lower than $V_{Ld}$, a judgment is made as to whether or not the $V_{do} - \omega L_q I_q$ is positive (step S107). If it is positive, $V_{Ld}$ is outputted as the d-axis target voltage $V_d^*$ (step S108), and if it is not positive, $-V_{Ld}$ is outputted as the d-axis target voltage $V_d^*$ (step S109). Furthermore, a judgment is made as to whether or not the absolute value of $V_{qo} + \omega L_d I_d + \omega \Phi$ is equal to or less than $V_{Lq}$ (step S110), and if it is equal to or less than $V_{Lq}$, then $V_{qo} + \omega L_d I_d + \omega \Phi$ is outputted as the q-axis target voltage $V_q^*$ (step S111), and if it is not equal to or less than $V_{Lq}$, then a judgment is made as to whether or not the $V_{qo} + \omega L_d I_d + \omega \Phi$ is positive (step S112). If it is positive, $V_{Lq}$ is outputted as the q-axis target voltage $V_q^*$ (step S113), and if it is not positive, then $-V_{Lq}$ is outputted as the q-axis target voltage $V_q^*$ (step S114). Then, the absolute value of the result $V_{do}$ of the PI calculation for the d-axis current that is used as a preceding value of the PI calculation in the next calculation cycle is limited to the d-axis limiting value $V_{Ld}$ by the second d-axis limiter 51e, and the absolute value of the result $V_{qo}$ of the PI calculation for the q-axis current that is used as a preceding value of the PI calculation in the next calculation cycle is limited to the q-axis limiting value $V_{Lq}$ by the second q-axis limiter 52e. To be more precise, whether or not the absolute value of $V_{do}$ is equal to or less than $V_{Ld}$ is judged (step S115), and if it is equal to or less than $V_{Ld}$, then $V_{do}$ is taken as an output value $V_{do}'$ of the second d-axis limiter 51e and stored to be used as a preceding value of the PI calculation in the next calculation cycle (step S116). If it is not equal to or less than $V_{Ld}$, then whether or not $V_{do}$ is positive is judged (step S117). If it is positive, then $V_{Ld}$ is taken as an output value $V_{do}'$ of the second d-axis limiter 51e and stored to be used as a preceding value of the PI calculation in the next calculation cycle (step S118), if it is not positive, then $-V_{Ld}$ is taken as an output value $V_{do}'$ of the second d-axis limiter 51e and stored to be used as a preceding value of the PI calculation in the next calculation cycle (step S119). Then, a judgment is made as to whether or not the absolute value of $V_{qo}$ is equal to or less than $V_{Lq}$ (step S120), if it is equal to or less than $V_{Lq}$, then $V_{qo}$ is taken as an output value $V_{qo}'$ of the second q-axis limiter 52e and stored to be used as a preceding value of the PI calculation in the next calculation cycle (step S121), and if it is not equal to or less than $V_{Lq}$, then whether or not $V_{qo}$ is positive is judged (step S122). If it is positive, then $V_{Lq}$ is taken as an output value $V_{qo}'$ of the second q-axis limiter 52e and stored to be used as a preceding value of the PI calculation in the next calculation cycle (step S123), and if it is not positive, then $-V_{Lq}$ is taken as an output value $V_{qo}'$ of the second q-axis limiter 52e and stored to be used as a preceding value of the PI calculation in the next calculation cycle (step S124), followed by the return.

According to the above-described embodiment, the d-axis target voltage $V_d^*$ is determined based on the value obtained by correcting the result $V_{do}$ of the PI calculation for the d-axis current with the d-axis correction value $-\omega L_q I_q$, so that the influence on the responsiveness of the motor 1 due to the difference between the d-axis target voltage $V_d^*$ and the d-axis voltage $V_d$ arising in accordance with the rotation speed $\omega$ and the q-axis current $I_q$ can be reduced by comparison with the case where no such correction is made. Furthermore, the q-axis target voltage $V_q^*$ is determined based on the value obtained by correcting the result $V_{qo}$ of the PI calculation for the q-axis current with the q-axis correction value $\omega L_d I_d + \omega \Phi$, so that the influence on the responsiveness of the motor 1 due to the difference between the q-axis target voltage $V_q^*$ and the q-axis voltage $V_q$ arising in accordance with the rotation speed $\omega$, the d-axis current $I_d$, and the magnetic flux $\Phi$ can be reduced by comparison with the case where no such correction is made.

Further, the absolute value of the sum of the d-axis correction value $-\omega L_q I_q$ and the result $V_{do}$ of the PI calculation for the d-axis current is limited to the d-axis limiting value $V_{Ld}$ by the first d-axis limit 51d. The d-axis target voltage $V_d^*$ can be determined based on this value limited by the first d-axis limiter 51d, that is, based on the output value of the first d-axis limiter 51d. Furthermore, the absolute value of the result $V_{do}$ of the PI calculation for the d-axis current is limited to the d-axis limiting value $V_{Ld}$ by the second d-axis limiter 51e. This value limited by the second d-axis limiter 51e, that is, the output value $V_{do}'$ of the second d-axis limiter 51e, can be used as a preceding value of the PI calculation for the d-axis current in the next calculation cycle. As a result, the result $V_{do}$ of the PI calculation for the d-axis current can be corrected and the preceding value of the PI calculation in the next calculation cycle can be limited by the second d-axis limiter 51e, without unnecessarily decreasing the absolute value of the d-axis target voltage $V_d^*$ and without adding the correction value to the preceding value of the PI calculation in the next calculation cycle.

Likewise, the absolute value of the sum of the q-axis correction value $\omega L_d I_d + \omega \Phi$ and the result $V_{qo}$ of the PI calculation for the q-axis current is limited to the q-axis limiting value $V_{Lq}$ by the first q-axis limiter 52d. The q-axis target voltage $V_q^*$ can be determined based on this value limited by the first q-axis limiter 52d, that is, based on the output value of the first q-axis limiter 52d. Furthermore, the absolute value of the result $V_{qo}$ of the PI calculation for the q-axis current is limited to the q-axis limiting value $V_{Lq}$ by the second q-axis limiter 52e. This value limited by the second q-axis limiter 52e, that is, the output value $V_{qo}'$ of the second q-axis limiter 52e, can be used as a preceding value of the PI calculation for the q-axis current in the next calculation cycle. As a result, the result $V_{qo}$ of the PI calculation for the q-axis current can be corrected and the preceding value of the PI calculation in the next calculation cycle can be limited by the second q-axis limiter 52e, without unnecessarily decreasing the absolute value of the q-axis target voltage $V_q^*$ and without adding the correction value to the preceding value of the PI calculation in the next calculation cycle.

Figure 7A:
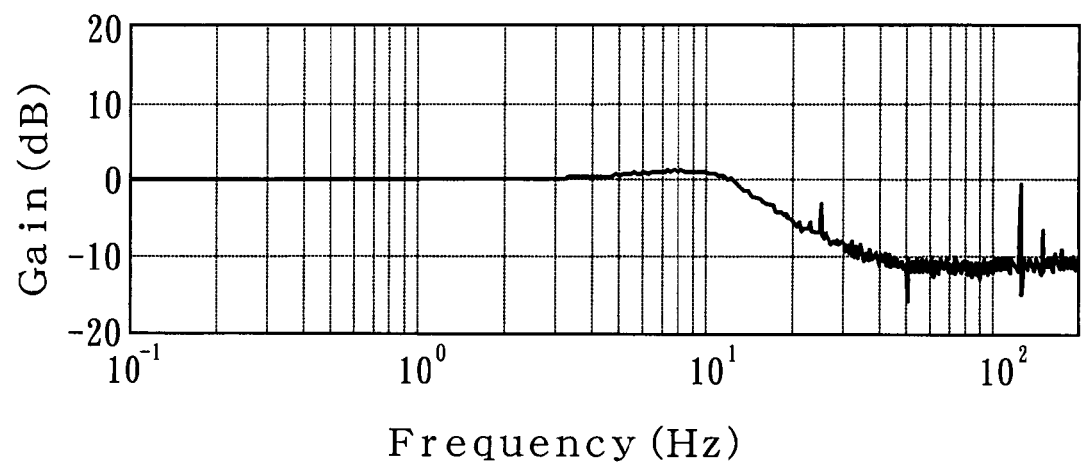
FIG. 7A is a bode diagram representing a frequency response characteristic of q-axis current relative to q-axis target current in a case where the rotation speed of the brushless motor of the comparative example is 1500 rpm.
Figure 7A:
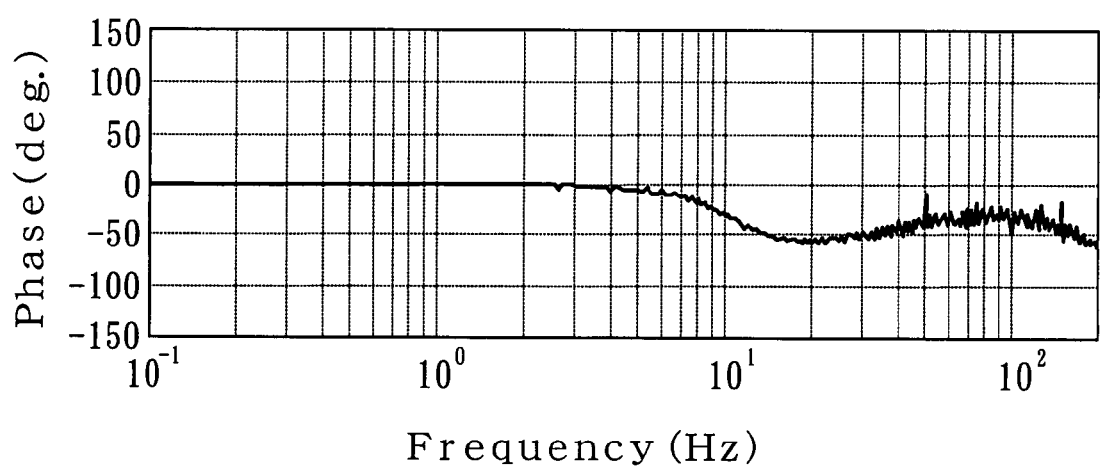
Figure 7B:
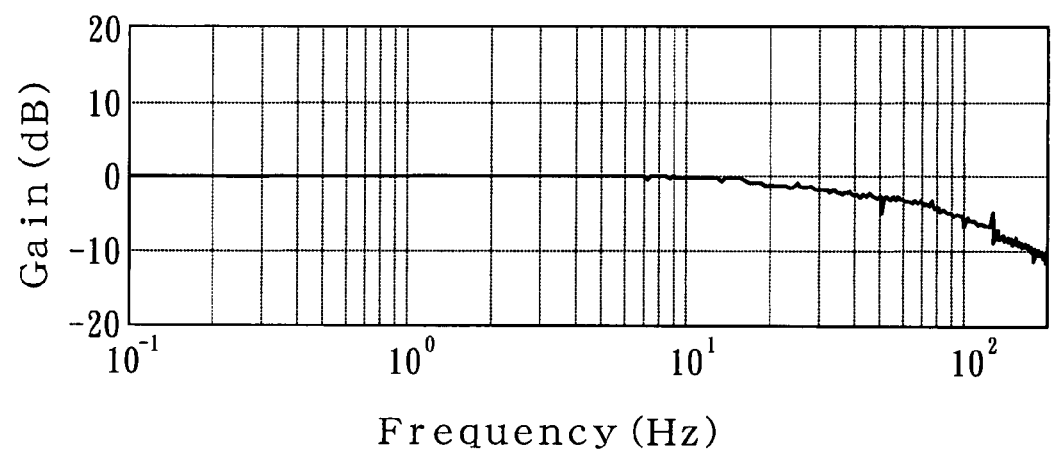
FIG. 7B is a bode diagram representing a frequency response characteristic of q-axis current relative to q-axis target current in a case where the rotation speed of the brushless motor of the first embodiment is 1500 rpm.
Figure 7B:
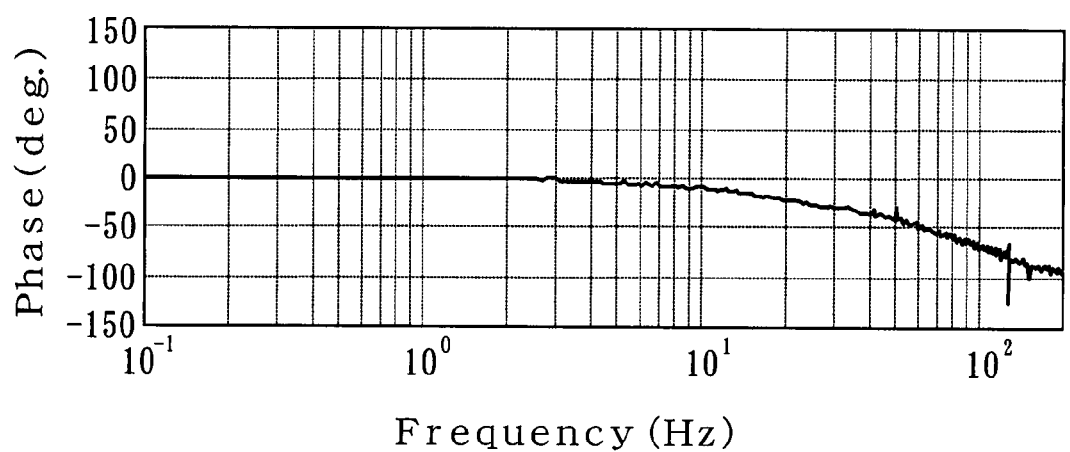
Figure 8A:
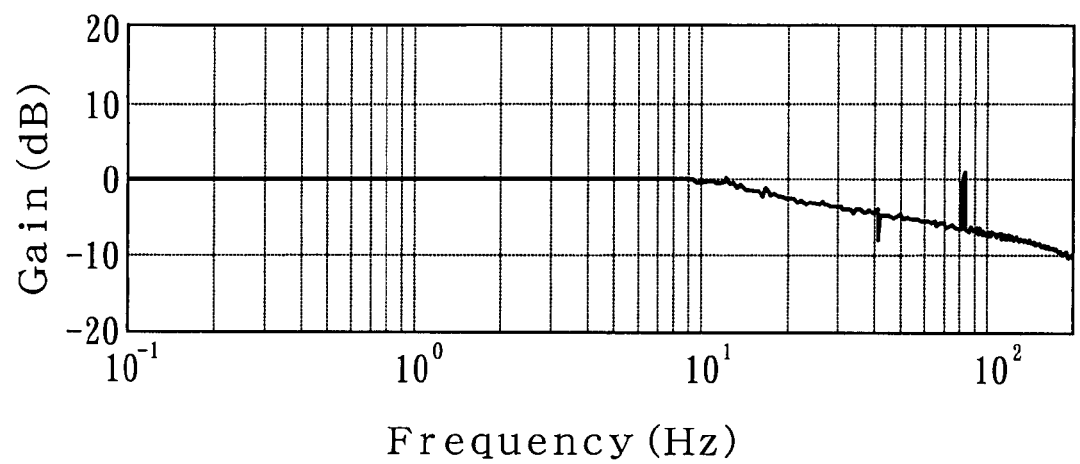
FIG. 8A is a bode diagram representing a frequency response characteristic of q-axis current relative to q-axis target current in a case where the rotation speed of the brushless motor of the comparative example is 500 rpm.
Figure 8A:
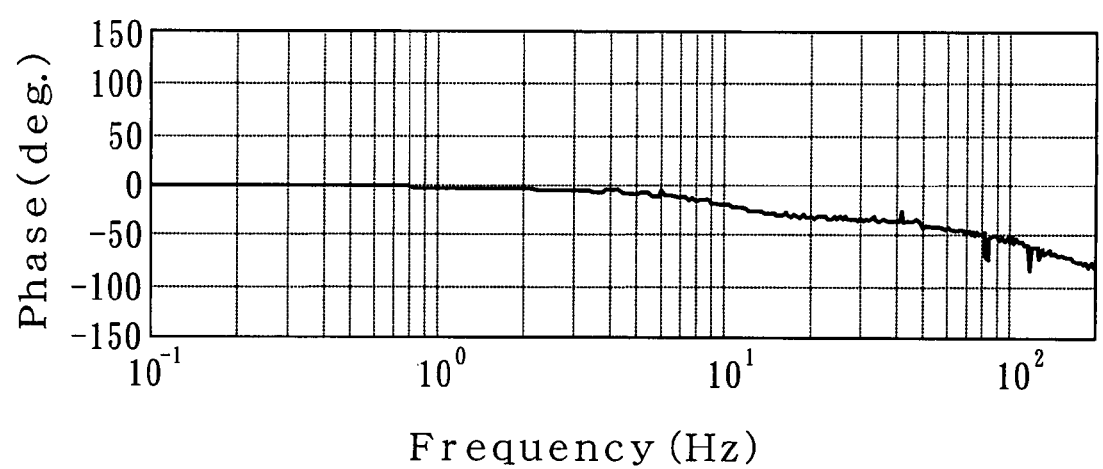
Figure 8B:
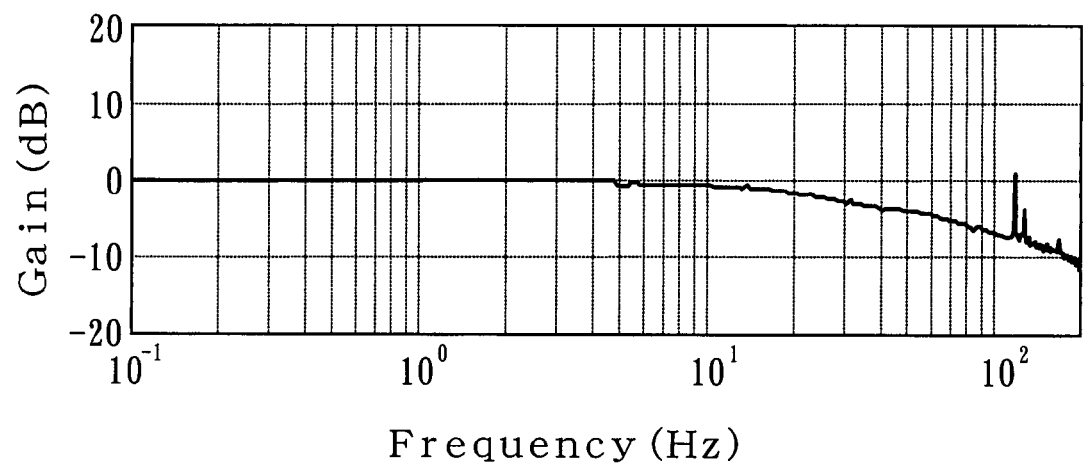
FIG. 8B is a bode diagram representing a frequency response characteristic of q-axis current relative to q-axis target current in a case where the rotation speed of the brushless motor of the first embodiment is 500 rpm.
Figure 8B:
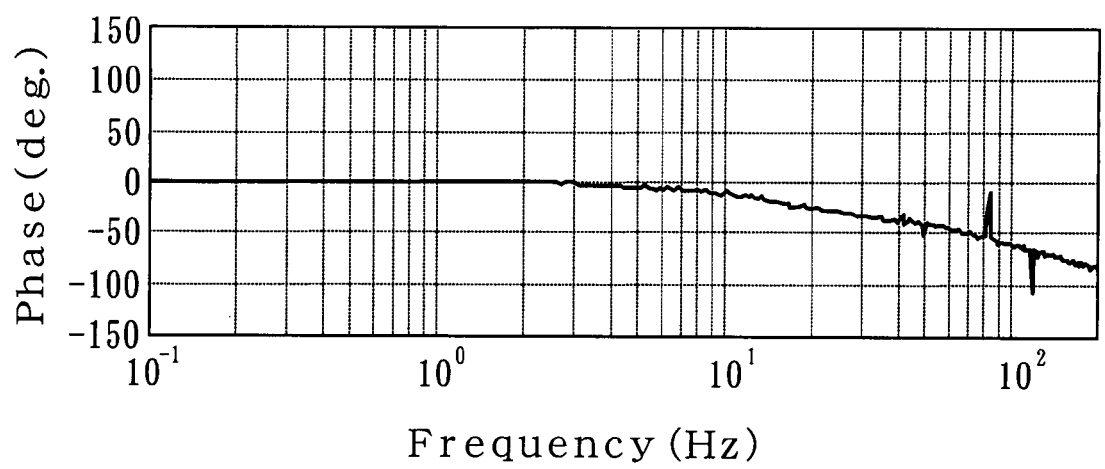

FIG. 7A and FIG. 7B are bode diagrams illustrating the frequency response characteristic of the q-axis current relative to the q-axis target current in a case where the rotation speed of the brushless motor is 1500 rpm. FIG. 7A illustrates a comparative example in which the correction of the result of the PI calculation is not performed, and FIG. 7B illustrates a case where the correction is performed as in the above-described embodiment. FIG. 8A and FIG. 8B are bode diagrams illustrating the frequency response characteristic of the q-axis current relative to the q-axis target current in a case where the rotation speed of the brushless motor is 500 rpm. FIG. 8A illustrates a comparative example in which the correction of the result of the PI calculation is not performed, and FIG. 8B illustrates a case where the correction is performed as in the above-described embodiment. It is confirmed by the bode diagrams that the influence of rotation speed on the responsiveness of the brushless motor can be reduced, and the responsiveness can be stabilized.

A controller for brushless motor of the second embodiment of the present invention is described below with reference to FIG. 9 and FIG. 10. The explanation of components identical to those of the first embodiment is omitted and differences between the embodiments are explained.

Figure 9:
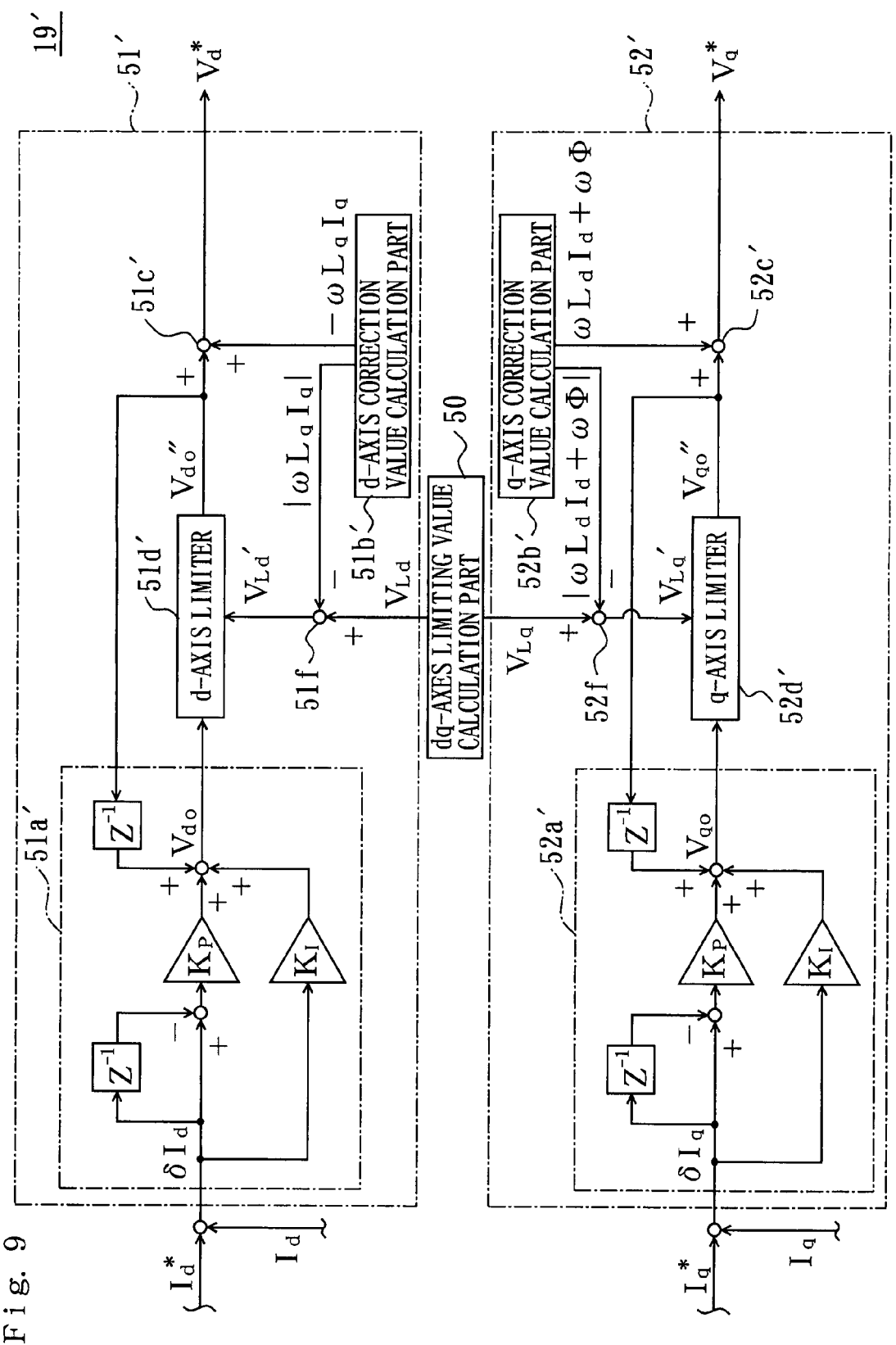
FIG. 9 is a block-diagram illustrating the configuration of a dq-axes target voltage calculation part in the controller of the second embodiment of the present invention.

As shown in a block diagram in FIG. 9, a dq-axes target voltage calculation part 19' of the second embodiment has a dq-axes limiting value calculation part 50, a d-axis target voltage calculation part 51', and a q-axis target voltage calculation part 52'. The d-axis target voltage calculation part 51' determines a d-axis target voltage $V_d^*$ based on the PI calculation for the d-axis current so as to decrease the d-axis difference $\delta I_d$. The q-axis target voltage calculation part 52' determines a q-axis target voltage $V_q^*$ based on the PI calculation for the q-axis current so as to decrease the q-axis difference $\delta I_q$.

Similarly to the first embodiment, the dq-axes limiting value calculation part 50 of the second embodiment determines a d-axis limiting value $V_{Ld}$ and a q-axis limiting value $V_{Lq}$ such that the target applied voltages to the armature winding of the motor 1 do not exceed a set maximum value $V_{max}$ and the waveform representing the variation of the voltage applied to the armature winding relative to the variation of the rotation position of the rotor 1b becomes a sine wave rather than a discontinuous wave.

The d-axis target voltage calculation part 51' has a d-axis PI calculation part 51a', a d-axis correction value calculation part 51b', a d-axis addition part 51c', a d-axis limiter 51d', and a d-axis corrected limiting value calculation part 51f.

Similarly to the first embodiment, the d-axis PI calculation part 51a' calculates a value $V_{do}$ by the PI calculation for the d-axis current, and outputs the result $V_{do}$ of the PI calculation to the d-axis limiter 51d'.

Similarly to the first embodiment, the d-axis correction value calculation part 51b' determines a d-axis correction value $-\omega L_q I_q$ and also determines an absolute value of the d-axis correction value $-\omega L_q I_q$.

The d-axis corrected limiting value calculation part 51f determines a d-axis corrected limiting value $V_{Ld}'$ by subtracting the absolute value of the d-axis correction value $-\omega L_q I_q$ from the d-axis limiting value $V_{Ld}$.

The d-axis limiter 51d' limits the absolute value of the result $V_{do}$ of the PI calculation for the d-axis current to the d-axis corrected limiting value $V_{Ld}'$.

The d-axis addition part 51c' adds the d-axis correction value $-\omega L_q I_q$ to an output value $V_{do}''$ of the d-axis limiter 51d'. The output value of the d-axis addition part 51c' is treated as the d-axis target value $V_d^*$. As a result, the d-axis target value $V_d^*$ is determined based on the value obtained by correcting the limited result $V_{do}$ of the PI calculation for the d-axis current with the d-axis correction value $-\omega L_q I_q$.

Furthermore, the output value $V_{do}''$ of the d-axis limiter 51d' is used as a preceding value of the PI calculation for the d-axis current in the next calculation cycle.

The q-axis target voltage calculation part 52' has a q-axis PI calculation part 52a', a q-axis correction value calculation part 52b', a q-axis addition part 52c', a q-axis limiter 52d', and a q-axis corrected limiting value calculation part 52f.

Similarly to the first embodiment, the q-axis PI calculation part 52a' calculates a value $V_{qo}$ by the PI calculation for the q-axis current, and outputs the result $V_{qo}$ of the PI calculation to the q-axis limiter 52d'.

Similarly to the first embodiment, the q-axis correction value calculation part 52b' determines a q-axis correction value $\omega L_d I_d + \omega \Phi$ and also determines an absolute value of the q-axis correction value $\omega L_d I_d + \omega \Phi$.

The q-axis corrected limiting value calculation part 52f determines a q-axis corrected limiting value $V_{Lq}'$ by subtracting the absolute value of the q-axis correction value $\omega L_d I_d + \omega \Phi$ from the q-axis limiting value $V_{Lq}$.

The q-axis limiter 52d' limits the absolute value of the result $V_{qo}$ of the PI calculation for the q-axis current to the q-axis corrected limiting value $V_{Lq}'$.

The q-axis addition part 52c' adds the q-axis correction value $\omega L_d I_d + \omega \Phi$ to the output value $V_{qo}''$ of the q-axis limiter 52d'. The output value of the q-axis addition part 52c' is treated as the q-axis target value $V_q^*$. As a result, the q-axis target value $V_q^*$ is determined based on the value obtained by correcting the limited result $V_{qo}$ of the PI calculation for the q-axis current with the q-axis correction value $\omega L_d I_d + \omega \Phi$.

Furthermore, the output value $V_{qo}''$ of the q-axis limiter 52d' is used as a preceding value of the PI calculation for the q-axis current in the next calculation cycle.

Figure 10:
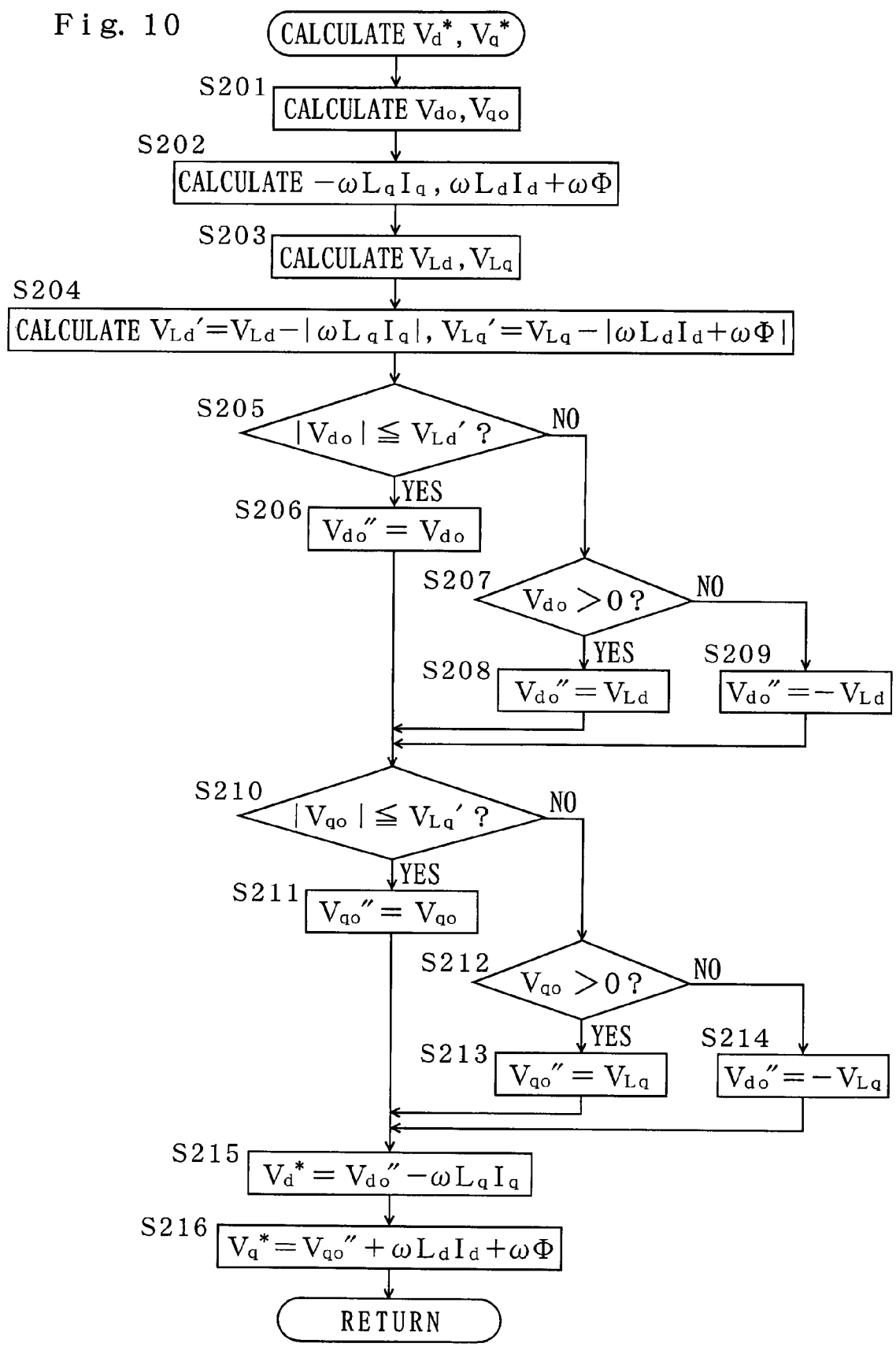
FIG. 10 is a flow chart illustrating the calculation procedure of the target voltage with the controller of the second embodiment of the present invention.
Figure 11:
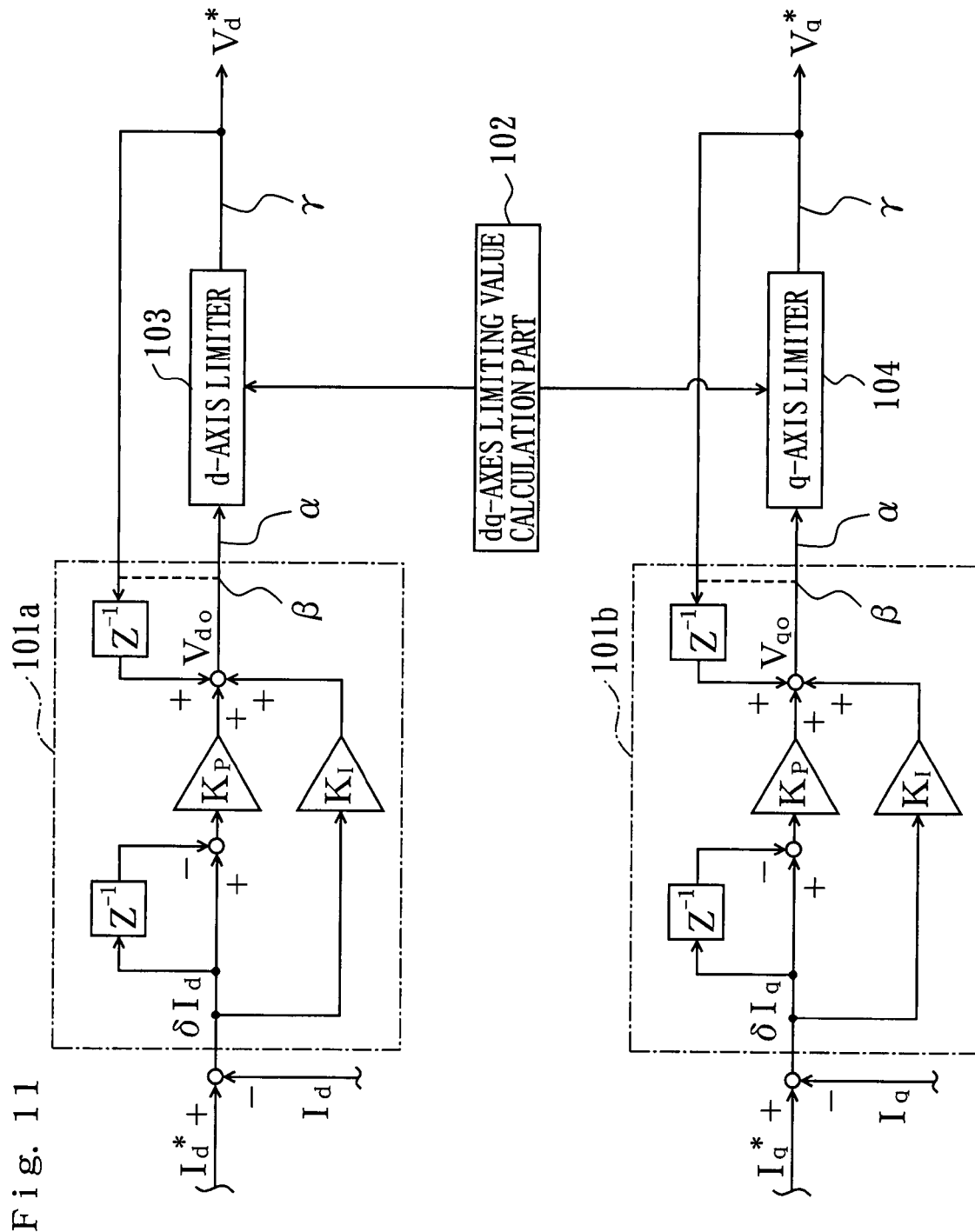
FIG. 11 is a block diagram illustrating the configuration of a dq-axis target voltage calculation part in the controller of a brushless motor of the comparative example of the present invention.

The flowchart of FIG. 10 shows a calculation procedure of the d-axis target voltage $V_d^*$ and the q-axis target voltage $V_q^*$ at the above-described step S6 in the second embodiment. First, results $V_{do}$, $V_{qo}$ of the PI calculation are determined by the PI calculation for the d-axis current and the PI calculation for the q-axis current (step S201), a d-axis correction value $-\omega L_q I_q$ is determined in the d-axis correction value calculation part 51b', and a q-axis correction value $\omega L_d I_d + \omega \Phi$ is determined in the q-axis correction value calculation part 52b' (step S202). Furthermore, a d-axis limiting value $V_{Ld}$ and a q-axis limiting value $V_{Lq}$ are calculated (step S203), a d-axis corrected limiting value $V_{Ld}'$ is determined in the d-axis corrected limiting value calculation part 51f by subtracting the absolute value of the d-axis correction value $\omega L_q I_q$ from the d-axis limiting value $V_{Ld}$, and a q-axis corrected limiting value $V_{Lq}'$ is determined in the q-axis corrected limiting value calculation part 52f by subtracting the absolute value of the q-axis correction value $\omega L_d I_d + \omega \Phi$ from the q-axis limiting value $V_{Lq}$ (step S204). Then, the absolute value of the result $V_{do}$ of the PI calculation for the d-axis current that is used as a preceding value of the PI calculation in the next calculation cycle is limited to the d-axis corrected limiting value $V_{Ld}'$ by the d-axis limiter 51d', and the absolute value of the result $V_{qo}$ of the PI calculation for the q-axis current that is used as a preceding value of the PI calculation in the next calculation cycle is limited to the q-axis corrected limiting value $V_{Lq}'$ by the q-axis limiter 52d'. In other words, whether or not the absolute value of $V_{do}$ is equal to or lower than $V_{Ld}'$ is judged (step S205), and if it is equal to or less than $V_{Ld}'$, the $V_{do}$ is taken as the output value $V_{do}''$ of the d-axis limiter 51d' and stored to be used as a preceding value of the PI calculation in the next calculation cycle (step S206), if it is not equal to or lower than $V_{Ld}'$, a judgment is made as to whether or not the $V_{do}$ is positive (step S207). If it is positive, $V_{Ld}$ is taken as the output value $V_{do}''$ of the d-axis limiter 51d' and stored to be used as a preceding value of the PI calculation in the next calculation cycle (step S208), and if it is not positive, $-V_{Ld}$ is taken as the output value $V_{do}''$ of the d-axis limiter 51d' and stored to be used as a preceding value of the PI calculation in the next calculation cycle (step S209). Furthermore, a judgment is made as to whether or not the absolute value of $V_{qo}$ is equal to or less than $V_{Lq}'$ (step S210), and if it is equal to or less than $V_{Lq}'$, then $V_{qo}$ is taken as the output value $V_{qo}''$ of the q-axis limiter 52d' and stored to be used as a preceding value of the PI calculation in the next calculation cycle (step S211), if it is not equal to or lower than $V_{Lq}'$, a judgment is made as to whether or not the $V_{qo}$ is positive (step S212). If it is positive, $V_{Lq}$ is taken as the output value $V_{qo}''$ of the q-axis limiter 52d' and stored to be used as a preceding value of the PI calculation in the next calculation cycle (step S213), and if it is not positive, $-V_{Lq}$ is taken as the output value $V_{qo}''$ of the q-axis limiter 52d' and stored to be used as a preceding value of the PI calculation in the next calculation cycle (step S214). Then, a value obtained by adding the d-axis correction value $-\omega L_q I_q$ to the output value $V_{do}''$ of the d-axis limiter 51d' in the d-axis addition part 51c' is outputted as the d-axis target voltage $V_d^*$ (step S215), and a value obtained by adding the q-axis correction value $\omega L_d I_d + \omega \Phi$ to the output value $V_{qo}''$ of the q-axis limiter 52d' in the q-axis addition part 52c' is outputted as the q-axis target voltage $V_q^*$ (step S216), followed by the return.

According to the above-described second embodiment, the d-axis corrected limiting value $V_{Ld}'$ that is obtained by subtracting the absolute value of d-axis correction value $-\omega L_q I_q$ from the d-axis limiting value $V_{Ld}$ is determined with the d-axis corrected limiting value calculation part 51f, and the absolute value of the result $V_{do}$ of the PI calculation for the d-axis current is limited to the d-axis corrected limiting value $V_{Ld}'$ by the d-axis limiter 51d'. This value limited by the d-axis limiter 51d', that is the output value $V_{do}''$ of the d-axis limiter 51d', can be used as a preceding value of the PI calculation for the d-axis current in the next calculation cycle. Further, the d-axis target voltage $V_d^*$ can be determined based on a value obtained by adding the d-axis correction value $-\omega L_q I_q$ to the output value $V_{do}''$ of the d-axis limiter 51d', that is, based on the output value of the d-axis addition part 51c'. Therefore, the result $V_{do}$ of the PI calculation for the d-axis current can be corrected and the preceding value of the PI calculation for the d-axis current in the next calculation cycle can be limited by the d-axis limiter 51d', without unnecessarily decreasing the absolute value of the d-axis target voltage $V_d^*$ and without adding the correction value to the preceding value of the PI calculation for the d-axis current in the next calculation cycle. Moreover, the preceding value of the PI calculation for the d-axis current in the next calculation cycle is limited to the d-axis corrected limiting value $V_{Ld}'$ rather than to the d-axis limiting value $V_{Ld}$. The d-axis limiting value $V_{Ld}$ is determined such that it does not exceed the set maximum value of the target voltages applied to the armature winding of motor 1. Further, when one of the d-axis voltage $V_d$ and the q-axis voltage $V_q$ increases, the other decreases, and the d-axis correction value $-\omega L_q I_q$ correlates with the q-axis current $I_q$. Therefore, the d-axis corrected limiting value $V_{Ld}'$ obtained by subtracting the absolute value of the d-axis correction value $-L_q I_q$ from the d-axis limiting value $V_{Ld}$ can be brought close to the actual maximum value that can be applied to the armature winding. Thus, the preceding value of the PI calculation for the d-axis current in the next calculation cycle is prevented from being limited to an unnecessarily large limiting value, and the convergence ability of the result $V_{do}$ of the PI calculation for the d-axis can be improved.

Likewise, the q-axis corrected limiting value $V_{Lq}'$ that is obtained by subtracting the absolute value of the q-axis correction value $\omega L_d I_d + \omega \Phi$ from the q-axis limiting value $V_{Lq}$ is determined with the q-axis corrected limiting value calculation part 52f, and the absolute value of the result $V_{qo}$ of the PI calculation for the q-axis current is limited to the q-axis corrected limiting value $V_{Lq}'$ by the q-axis limiter 52d'. This value limited by the q-axis limiter $52d'$, that is the output value $V_{qo}''$ of the q-axis limiter $52d'$, can be used as a preceding value of the PI calculation for the q-axis current in the next calculation cycle. Further, the q-axis target voltage $V_q^*$ can be determined based on the value obtained by adding the q-axis correction value $\omega L_d I_d + \omega \Phi$ to the result of the PI calculation limited by the q-axis limiter $52d'$, that is, based on the output value of the q-axis addition part $52c'$. Therefore, the result $V_{qo}$ of the PI calculation for the q-axis current can be corrected and the preceding value of the PI calculation for the q-axis current in the next calculation cycle can be limited by the q-axis limiter $52d'$, without unnecessarily decreasing the absolute value of the q-axis target voltage $V_q^*$ and without adding the correction value to the preceding value of the PI calculation for the q-axis current in the next calculation cycle.

Moreover, the preceding value of the PI calculation for the q-axis current in the next calculation cycle is limited to the q-axis corrected limiting value $V_{Lq}'$ rather than to the q-axis limiting value $V_{Lq}$. The q-axis limiting value $V_{Lq}$ is determined such that it does not exceed the set maximum value of the target voltages applied to the armature winding. Further, when one of the d-axis voltage $V_d$ and q-axis voltage $V_q$ increases, the other decreases, and the q-axis correction value $\omega L_d I_d + \omega \Phi$ correlates with the d-axis current $I_d$. Therefore, the q-axis corrected limiting value $V_{Lq}'$ obtained by subtracting the absolute value of the q-axis correction value $\omega L_d I_d + \omega \Phi$ from the q-axis limiting value $V_{Lq}$ can be brought close to the actual maximum value that can be applied to the armature winding. Thus, the preceding value of the PI calculation for the q-axis current in the next calculation cycle is prevented from being limited to an unnecessarily large limiting value, and convergence ability of the result $V_{qo}$ of the PI calculation in the q-axis can be improved.

Other features are similar to those of the first embodiment.

As a modification of the above-described embodiments, $\omega L_d I_d$ can be used instead of $\omega L_d I_d + \omega \Phi$ as the q-axis correction value determined by the q-axis correction value calculation parts $52b$, $52b'$, other features being identical to those of the embodiment. In this case, the q-axis target voltage $V_q^*$ is determined based on a value obtained by correcting the result $V_{qo}$ of the PI calculation for the q-axis current with the q-axis correction value $\omega L_d I_d$, and the influence on the responsiveness of the motor 1 due to the difference between the q-axis target voltage $V_q^*$ and the q-axis voltage $V_q$ occurring arising in accordance with the rotation speed $\omega$ and the d-axis current $I_d$ can be also reduced by comparison with the case where no such correction is made.

The present invention is not limited to the above-described embodiments. For example, the feedback calculation for decreasing the d-axis difference and the q-axis difference is not limited to the PI calculation of the embodiments, and other feedback calculation such as the P calculation or the PID calculation can be used, provided that the differences are decreased. Further, the brushless motor is not limited to a three-phase configuration, and the application thereof is not limited to the generation of steering assist power.

What is claimed is:

1. A controller for a brushless motor, comprising
a current detection part that detects a current flowing in an armature winding of said motor;
a rotation position detection part that detects a rotation position of a rotor of said motor;
a dq-axes target current calculation part that calculates a d-axis target current and a q-axis target current, where an axis along a magnetic flux direction of a field system of said rotor is taken as the d axis, and an axis perpendicular to said d axis and a rotation axis of said rotor is taken as the q axis;
a dq-axes current calculation part that determines a d-axis current and a q-axis current based on the detected current and the detected rotation position;
a d-axis target voltage calculation part that determines a d-axis target voltage based on a feedback calculation for said d-axis current so as to decrease a d-axis difference between said d-axis target current and said d-axis current; and
a q-axis target voltage calculation part that determines a q-axis target voltage based on a feedback calculation for said q-axis current so as to decrease a q-axis difference between said q-axis target current and said q-axis current, wherein
a rotation force of said rotor is generated by applying a voltage to said armature winding based on said d-axis target voltage, said q-axis target voltage, and the detected rotation position;
a d-axis correction value calculation part for determining a d-axis correction value and a q-axis correction value calculation part for determining a q-axis correction value are provided;
said d-axis target voltage is determined based on a value obtained by correcting a result of the feedback calculation for said d-axis current with said d-axis correction value; and
said q-axis target voltage is determined based on a value obtained by correcting a result of the feedback calculation for said q-axis current with said q-axis correction value; said controller further comprising
a dq-axes limiting value calculation part that determines a d-axis limiting value and a q-axis limiting value so that a target voltage applied to said armature winding does not exceed a set maximum value;
a d-axis addition part that adds said d-axis correction value to the result of the feedback calculation for said d-axis current;
a q-axis addition part that adds said q-axis correction value to the result of the feedback calculation for said q-axis current;
a first d-axis limiter that limits an absolute value of the sum of said d-axis correction value and the result of the feedback calculation for said d-axis current to said d-axis limiting value;
a second d-axis limiter that limits an absolute value of the result of the feedback calculation for said d-axis current to said d-axis limiting value;
a first q-axis limiter that limits an absolute value of the sum of said q-axis correction value and the result of the feedback calculation for said q-axis current to said q-axis limiting value; and
a second q-axis limiter that limits an absolute value of the result of the feedback calculation for said q-axis current to said q-axis limiting value, wherein
an output value of said first d-axis limiter is treated as said d-axis target voltage;
an output value of said first q-axis limiter is treated as said q-axis target voltage;
an output value of said second d-axis limiter is used as a preceding value in the feedback calculation for said d-axis current in a next calculation cycle; and
an output value of said second q-axis limiter is used as a preceding value in the feedback calculation for said q-axis current in a next calculation cycle.

2. The controller for a brushless motor according to claim 1, wherein said d-axis correction value calculation part determines $-\omega L_q I_q$ as said d-axis correction value and said q-axis correction value calculation part determines $\omega L_d I_d + \omega \Phi$ as said q-axis correction value, where $\omega$ stands for a rotation speed (rad/sec) of said rotor, $L_d$ stands for a d-axis self-inductance of said armature winding, $L_q$ stands for a q-axis self-inductance of said armature winding, $I_d$ stands for said d-axis current, $I_q$ stands for said q-axis current, and $\Phi$ stands for a value obtained by multiplying a maximum value of magnetic flux linkage of said armature winding in said field system by a factor of $(3/2)^{1/2}$.

3. The controller for a brushless motor according to claim 1, wherein said d-axis correction value calculation part determines $-\omega L_q I_q$ as said d-axis correction value and said q-axis correction value calculation part determines $\omega L_d I_d$ as said q-axis correction value, where $\omega$ stands for a rotation speed (rad/sec) of said rotor, $L_d$ stands for a d-axis self-inductance of said armature winding, $L_q$ stands for a q-axis self-inductance of said armature winding, $I_d$ stands for said d-axis current, $I_q$ stands for said q-axis current.

4. A controller for a brushless motor, comprising
a current detection part that detects a current flowing in an armature winding of said motor;
a rotation position detection part that detects a rotation position of a rotor of said motor;
a dq-axes target current calculation part that calculates a d-axis target current and a q-axis target current, where an axis along a magnetic flux direction of a field system of said rotor is taken as the d axis, and an axis perpendicular to said d axis and a rotation axis of said rotor is taken as the q axis;
a dq-axes current calculation part that determines a d-axis current and a q-axis current based on the detected current and the detected rotation position;
a d-axis target voltage calculation part that determines a d-axis target voltage based on a feedback calculation for said d-axis current so as to decrease a d-axis difference between said d-axis target current and said d-axis current; and
a q-axis target voltage calculation part that determines a q-axis target voltage based on a feedback calculation for said q-axis current so as to decrease a q-axis difference between said q-axis target current and said q-axis current, wherein
a rotation force of said rotor is generated by applying a voltage to said armature winding based on said d-axis target voltage, said q-axis target voltage, and the detected rotation position;
a d-axis correction value calculation part for determining a d-axis correction value and a q-axis correction value calculation part for determining a q-axis correction value are provided;
said d-axis target voltage is determined based on a value obtained by correcting a result of the feedback calculation for said d-axis current with said d-axis correction value; and
said q-axis target voltage is determined based on a value obtained by correcting a result of the feedback calculation for said q-axis current with said q-axis correction value; said controller further comprising
a dq-axes limiting value calculation part that determines a d-axis limiting value and a q-axis limiting value so that a target voltage applied to said armature winding does not exceed a set maximum value;
a d-axis corrected limiting value calculation part that determines a d-axis corrected limiting value that is obtained by subtracting an absolute value of said d-axis correction value from said d-axis limiting value;
a q-axis corrected limiting value calculation part that determines a q-axis corrected limiting value that is obtained by subtracting an absolute value of said q-axis correction value from said q-axis limiting value;
a d-axis limiter that limits an absolute value of the result of the feedback calculation for said d-axis current to said d-axis corrected limiting value;
a q-axis limiter that limits an absolute value of the result of the feedback calculation for said q-axis current to said q-axis corrected limiting value;
a d-axis addition part that adds said d-axis correction value to an output value of said d-axis limiter; and
a q-axis addition part that adds said q-axis correction value to an output value of said q-axis limiter, wherein
an output value of said d-axis addition part is treated as said d-axis target voltage;
an output value of said q-axis addition part is treated as said q-axis target voltage;
the output value of said d-axis limiter is used as a preceding value in the feedback calculation for said d-axis current in a next calculation cycle; and
the output value of said q-axis limiter is used as a preceding value in the feedback calculation for said q-axis current in a next calculation cycle.

5. The controller for a brushless motor according to claim 4, wherein said d-axis correction value calculation part determines $-\omega L_q I_q$ as said d-axis correction value and said q-axis correction value calculation part determines $\omega L_d I_d + \omega \Phi$ as said q-axis correction value, where $\omega$ stands for a rotation speed (rad/sec) of said rotor, $L_d$ stands for a d-axis self-inductance of said armature winding, $L_q$ stands for a q-axis self-inductance of said armature winding, $I_d$ stands for said d-axis current, $I_q$ stands for said q-axis current, and $\Phi$ stands for a value obtained by multiplying a maximum value of magnetic flux linkage of said armature winding in said field system by a factor of $(3/2)^{1/2}$.

6. The controller for a brushless motor according to claim 4, wherein said d-axis correction value calculation part determines $-\omega L_q I_q$ as said d-axis correction value and said q-axis correction value calculation part determines $\omega L_d I_d$ as said q-axis correction value, where $\omega$ stands for a rotation speed (rad/sec) of said rotor, $L_d$ stands for a d-axis self-inductance of said armature winding, $L_q$ stands for a q-axis self-inductance of said armature winding, $I_d$ stands for said d-axis axis current, $I_q$ stands for said q-axis current.

* * * * *